(12) United States Patent
Ding et al.

(10) Patent No.: US 11,999,223 B2
(45) Date of Patent: Jun. 4, 2024

(54) VEHICLE DOOR SYSTEM AND CONTROL METHOD THEREOF, AND VEHICLE HAVING SAME

(71) Applicant: HUMAN HORIZONS (SHANGHAI) NEW ENERGY POWERTRAIN TECHNOLOGY CO., LTD., Shanghai (CN)

(72) Inventors: Lei Ding, Shanghai (CN); Jun Yang, Shanghai (CN)

(73) Assignee: HUMAN HORIZONS (SHANGHAI) NEW ENERGY POWERTRAIN TECHNOLOGY CO., LTD., Shanghai (CN)

( * ) Notice: Subject to any disclaimer, the term of this patent is extended or adjusted under 35 U.S.C. 154(b) by 223 days.

(21) Appl. No.: 17/276,297

(22) PCT Filed: Sep. 10, 2019

(86) PCT No.: PCT/CN2019/105201
§ 371 (c)(1),
(2) Date: Mar. 15, 2021

(87) PCT Pub. No.: WO2020/052569
PCT Pub. Date: Mar. 19, 2020

(65) Prior Publication Data
US 2021/0291632 A1 Sep. 23, 2021

(30) Foreign Application Priority Data

Sep. 13, 2018 (CN) .......................... 201811070063.9
Sep. 13, 2018 (CN) .......................... 201811070632.X
(Continued)

(51) Int. Cl.
*B60J 7/16* (2006.01)
*B60J 5/04* (2006.01)

(52) U.S. Cl.
CPC .......... *B60J 7/1657* (2013.01); *B60J 5/0477* (2013.01); *E05Y 2400/45* (2013.01);
(Continued)

(58) Field of Classification Search
CPC ...... B60J 7/1657; B60J 5/0477; B60J 5/0479; B60J 5/047
See application file for complete search history.

(56) References Cited

U.S. PATENT DOCUMENTS 2,857,198 A 10/1958 John et al.
6,899,374 B1 * 5/2005 Heard .................... B60J 5/0473
296/155

(Continued)

FOREIGN PATENT DOCUMENTS

CN 101844503 A 9/2010
CN 104044437 A 9/2014
(Continued)

OTHER PUBLICATIONS

PCT International Search Report and Written Opinion (w/ English translation) for corresponding PCT Application No. PCT/US2019/105201, dated Dec. 9, 2019, 18 pages.
(Continued)

*Primary Examiner* — Jason S Morrow
(74) *Attorney, Agent, or Firm* — Dority & Manning, P.A.

(57) ABSTRACT

A vehicle door system and a control method thereof, and a vehicle having the same. The vehicle door system comprises: a top door, the top door opening or closing a first opening of a vehicle body top portion; and a side door, the side door comprising a side door member and a side window, wherein the side door member opens or closes a second opening of a vehicle body side wall, the side window is mounted on the side door member, both a top edge and a side edge of the side window are configured to be frameless, and
(Continued)

the side window is capable of raising or lowering relative to the side door member. When the side door body closes the second opening, the side window raises or lowers to open or close a third opening of the vehicle body side wall, wherein the third opening is located above the second opening, and the first opening, the second opening, and the third opening communicate with each other.

16 Claims, 24 Drawing Sheets

(30) Foreign Application Priority Data

Nov. 30, 2018 (CN) .......................... 201811470299.1
Jul. 31, 2019 (CN) .......................... 201910697567.1

(52) U.S. Cl.
CPC ..... *E05Y 2400/54* (2013.01); *E05Y 2900/531* (2013.01); *E05Y 2900/542* (2013.01)

(56) References Cited

U.S. PATENT DOCUMENTS

| 7,322,636 | B1* | 1/2008 | Woodhouse | B60J 5/0477 |
| | | | | 296/147 |
| 10,220,686 | B2* | 3/2019 | Baccouche | B60J 5/0479 |
| 10,583,717 | B2* | 3/2020 | Hoggarth | B60J 5/06 |
| 11,420,505 | B1* | 8/2022 | Wolf | B60J 7/1657 |
| 11,498,468 | B2* | 11/2022 | Hsu | B60N 2/002 |
| 11,525,291 | B2* | 12/2022 | Salter | E05B 81/06 |
| 2018/0251014 | A1 | 9/2018 | Baccouche et al. | |
| 2021/0122278 | A1* | 4/2021 | Hsu | B60N 2/143 |

FOREIGN PATENT DOCUMENTS

| CN | 104070970 A | 10/2014 |
| CN | 106555522 | 4/2017 |
| CN | 106555522 A | 4/2017 |
| CN | 108528176 A | 9/2018 |
| CN | 208152824 U | 11/2018 |
| CN | 109017237 | 12/2018 |
| CN | 109017238 | 12/2018 |
| CN | 109367370 | 2/2019 |
| CN | 209159370 U | 7/2019 |
| CN | 110203049 | 9/2019 |
| DE | 102010033585 | 2/2012 |
| DE | 202017104564 | 10/2017 |
| JP | 53-016217 | 7/1951 |
| JP | S58101821 | 6/1983 |
| JP | S6291316 | 4/1987 |
| JP | S 6291316 A | 4/1987 |
| JP | H0360488 | 6/1991 |
| JP | H0971133 | 3/1997 |
| JP | 2003-267052 | 9/2003 |
| JP | 2003267052 A | 9/2003 |
| JP | 2005088813 A | 4/2005 |

OTHER PUBLICATIONS

CN Office Action (w/ English translation) for corresponding Application No. CN2019106975671, dated Sep. 12, 2019, 12 pages.
CN Search Report (w/ English translation) for corresponding Application No. CN2019106975671, dated Sep. 6, 2019, 6 pages.
Extended European Search Report for corresponding EP Application No. 19858789.1, dated Apr. 26, 2022, 9 pages.
Japanese Office Action (with English Translation) for corresponding JP Application No. 2021-538882, dated Mar. 4, 2022, 10 pages.
First Office Action (with English translation) received in corresponding Application No. CN 201811470299.1, dated Sep. 21, 2023, 10 pages.
Search Report (with English translation) received in corresponding Application No. CN 201811470299.1, dated Sep. 21, 2023, 4 pages.

* cited by examiner

VEHICLE DOOR SYSTEM AND CONTROL METHOD THEREOF, AND VEHICLE HAVING SAME

CROSS-REFERENCE TO RELATED APPLICATIONS

This application is a national stage application of PCT International Application No. PCT/CN2019/105201, filed on Sep. 10, 2019, which is hereby incorporated by reference in its entirety.

The present application claims the priority to the Chinese patent application filed with the Chinese Patent Office on Jul. 31, 2019 with the filing No. 2019106975671, and entitled "Vehicle Door System, Control Method Thereof and Vehicle Having the Same", and the priority of Chinese patent application filed with the Chinese Patent Office on Nov. 30, 2018 with the filing No. 201811470299.1, and entitled "Sliding Door Assembly and Vehicle", the contents of which are incorporated herein by reference in entirety.

The Chinese patent application with the filing No. 2019106975671, and entitled "Vehicle Door System, Control Method Thereof and Vehicle Having the Same" further claims the priority to the Chinese patent application filed with the Chinese Patent Office on Sep. 13, 2018 with the filing No. 201811070063.9, and entitled "Vehicle", and the priority to the Chinese patent application filed with the Chinese Patent Office on Sep. 13, 2018 with the filing No. 2018110700632.X, and entitled "Vehicle", the contents of which are incorporated in the Chinese patent application with the filing No. 2019106975671, and entitled "Vehicle Door System, Control Method Thereof and Vehicle Having the Same" in entirety.

TECHNICAL FIELD

The present invention relates to the technical field of vehicle, in particular to a vehicle door system and a control method thereof, and a vehicle having the same.

BACKGROUND

The vehicle has become an indispensable means of transportation for human beings, and from the tendency of passenger vehicle modeling, making the vehicle body low is beneficial to reducing the wind resistance and increasing the stability, but will cause inconvenience for the passenger to get in and out of the vehicle. Taking a supercar with a low vehicle body as an example, all manufacturers are exploring novel ways to open the door so as to solve the above problem. For vehicles having a butterfly door, a top cover door, a gull wing door, and a falcon wing door in the related art, as the top structure and the side structure of the doors are connected, the top portion and the side portion are required to be opened at the same time to realize opening of the vehicle door, then when the vehicle door is opened in rain and snow, rain and snow will easily enter the vehicle body from the opened top portion. Further, water often accumulates on a top door, then when the top door is started to open a first opening after rain and snow, the accumulated water usually will enter the vehicle body from positions of edges of the top door and the first opening, thus causing contamination to the inside of the vehicle body.

SUMMARY

In order to solve one or more technical problems in the prior art, the present invention provides a vehicle door system and a control method thereof and a vehicle having the same.

In a first aspect, an embodiment of the present invention provides a vehicle door system, including: a top door, the top door opening and closing a first opening of a vehicle body top portion; and a side door, the side door including a side door body and a side window, wherein the side door body opens and closes a second opening of a vehicle body side skirt, the side window is mounted on the side door body, both a top edge and a side edge of the side window are configured to be frameless, and the side window is capable of raising or lowering relative to the side door body; when the side door body closes the second opening, the side window raises or lowers to open or close a third opening of the vehicle body side skirt, wherein the third opening is located above the second opening, and the first opening, the second opening, and the third opening are interconnected.

In an embodiment, the top door has a first rim cooperating with a top edge of the side window, and the first rim is mounted with a sealing member.

In an embodiment, the vehicle body has a doorway, and the doorway includes a top doorway and a side doorway, and wherein the first opening is formed in the top doorway, and the second opening and the third opening are formed in the side doorway.

In an embodiment, the side doorway includes a first side doorway and a second side doorway that are symmetrically provided; the side door includes a first side door and a second side door that are symmetrically provided, wherein the first side door is configured to open and close the first side doorway, and the second side door is configured to open and close the second side doorway; and the top door is connected to a top edge of the first side doorway or a top edge of the second side doorway.

In an embodiment, the doorway includes a first doorway and a second doorway that are symmetrically provided, the first doorway includes a first top doorway and a first side doorway, the second doorway includes a second top doorway and a second side doorway, and the first top doorway and the second top doorway are arranged at an interval; the side door includes a first side door and a second side door that are symmetrically provided, the first side door is configured to open and close the first side doorway, and the second side door is configured to open and close the second side doorway; and the top door includes a first top door and a second top door, the first top door is configured to open or close the first top doorway separately, and the second top door is configured to open or close the second top doorway separately.

In an embodiment, the vehicle door system further includes a first front door and a second front door, wherein the first front door is located between a vehicle body head portion and the first side door, and the second front door is located between the vehicle body head portion and the second side door, and wherein opening directions of the first side door and the first front door are the same or opposite, and opening directions of the second side door and the second front door are the same or opposite.

In an embodiment, the doorway includes at least one pair of first doorway and second doorway that are symmetrically provided, and at least one pair of third doorway and fourth doorway that are symmetrically provided, the first doorway includes a first top doorway and a first side doorway, the second doorway includes a second top doorway and a second side doorway, the third doorway includes a third top doorway and a third side doorway, and the fourth doorway includes a fourth top doorway and a fourth side doorway; and the top door includes a first top door, a second top door, a third top door, and a fourth top door provided corresponding to the first top doorway, the second top doorway, the third top doorway, and the fourth top doorway, respectively.

In an embodiment, the first top doorway, the second top doorway, the third top doorway, and the fourth top doorway are interconnected, and the first top door, the second top door, the third top door, and the fourth top door are an integral member so as to simultaneously open or close the first top doorway, the second top doorway, the third top doorway, and the fourth top doorway.

In an embodiment, the first top doorway, the second top doorway, the third top doorway, and the fourth top doorway are provided at intervals; and the first top door and the third top door are an integral member so as to simultaneously open or close the first top doorway and the third top doorway, and the second top door and the fourth top door are an integral member so as to simultaneously open or close the second top doorway and the fourth top doorway.

In an embodiment, the first top doorway, the second top doorway, the third top doorway, and the fourth top doorway are provided at intervals; and the first top door, the second top door, the third top door, and the fourth top door are separate members to each other, wherein the first top door is configured to separately open or close the first top doorway, the second top door is configured to separately open or close the second top doorway, the third top door is configured to separately open or close the third top doorway, and the fourth top door is configured to separately open or close the fourth top doorway.

In an embodiment, the side door includes a first side door, a second side door, a third side door, and a fourth side door that are provided corresponding to the first side doorway, the second side doorway, the third side doorway, and the fourth side doorway, respectively; and wherein opening directions of the first side door and the third side door are the same or opposite, and opening directions of the second side door and the fourth side door are the same or opposite.

In an embodiment, the vehicle body side skirt has a fourth opening interconnected with the third opening, and the vehicle door system further includes a corner window provided at the fourth opening.

In an embodiment, the corner window is fixed at the fourth opening.

In an embodiment, the corner window is movably provided at the fourth opening so as to open and close the fourth opening.

In an embodiment, the top door has a first rim adjacent to the top edge of the side window, and a second rim extending along a direction of the first rim towards a vehicle body tail portion, the corner window is mounted on the second rim, and the corner window is capable of moving along with the top door so as to open and close the fourth opening.

In an embodiment, a sealing member is provided between a corner window side rim and a side edge of the side window.

In an embodiment, the vehicle door system further includes a first top door lock assembly, wherein the first top door lock assembly includes a first component and a second component, the first component is mounted on the corner window, and the second component is mounted at an edge of the fourth opening, so that the first component and the second component are capable of being locked.

In an embodiment, the corner window is mounted at an edge of the fourth opening, and the corner window is capable of raising and lowering relative to the edge of the fourth opening.

In an embodiment, the corner window has a corner window side rim and a corner window top rim, the corner window side rim forms a portion of an edge of the third opening, the corner window side rim cooperates with a side rim of the side window, the top door has a first rim adjacent the top edge of the side window, and a second rim extending along a direction of the first rim towards a vehicle body tail portion, and the corner window top rim cooperates with the second rim; and wherein at least one of the corner window side rim, the corner window top rim, and the second rim is provided with a sealing member.

In an embodiment, the top door has a third rim, the third rim cooperates with a front edge of the first opening, the vehicle door system further includes a second top door lock assembly, the second top door lock assembly includes a third component and a fourth component, the third component is mounted at the third rim, and the fourth component is mounted at the front edge of the first opening, so that the third component and the fourth component are capable of being locked.

In an embodiment, the top door has a fourth rim, the fourth rim cooperates with a rear edge of the first opening, the vehicle door system further includes a third top door lock assembly, the third top door lock assembly includes a fifth component and a sixth component, the fifth component is mounted at the fourth rim, and the sixth component is mounted at the rear edge of the first opening, so that the fifth component and the sixth component are capable of being locked or restricting relative movement between the top door and the vehicle body top portion.

In an embodiment, the top door has a fifth rim connected to the vehicle body top portion, and the top door opens and closes the first opening of the vehicle body top portion with the fifth rim as a rotating shaft; the side door body has a sixth rim connected to the vehicle body side skirt, and the side door body opens and closes the second opening in the vehicle body side skirt with the sixth rim as a rotating shaft.

In an embodiment, the vehicle door system further includes a first sliding mechanism and a second sliding mechanism, wherein the first sliding mechanism and the second sliding mechanism are both provided between the vehicle body side skirt and the side door body, and the first sliding mechanism and the second sliding mechanism are configured to, in synchronization, drive the side door body to move relative to the vehicle body side skirt.

In an embodiment, the first sliding mechanism and the second sliding mechanism are arranged in a staggered manner in a direction from the vehicle body top portion to the vehicle body bottom portion, and the first sliding mechanism and the second sliding mechanism are arranged in a staggered manner in a direction from the vehicle body head portion to the vehicle body tail portion.

In an embodiment, the first sliding mechanism includes a first guide rail, a first hinge mount, and a first trolley, and wherein the first guide rail is provided on the vehicle body side skirt, the first hinge mount is provided on the side door body, the first trolley is provided on the first hinge mount, and the first trolley is capable of sliding along the first guide rail.

In an embodiment, the second sliding mechanism includes a second guide rail, a second hinge mount, and a second trolley, and wherein the second guide rail is provided on the vehicle body side skirt, the second hinge mount is provided on the side door body, the second trolley is provided on the second hinge mount, and the second trolley is capable of sliding along the second guide rail.

In an embodiment, the vehicle door system of any one of claims 1 to 26, further including a support driving assembly, wherein the support driving assembly is connected to the top door at one end, and connected to the vehicle body top portion or the side skirt at other end, so as to drive the top door to open and close the first opening.

In an embodiment, the vehicle door system further includes a hinge assembly, wherein the top door has a fifth rim connected to the vehicle body top portion, and the fifth rim of the top door is hinged to the vehicle body top portion by the hinge assembly.

In an embodiment, the top door has a third rim and a fourth rim, wherein the third rim cooperates with a front edge of the first opening, the fourth rim cooperates with a rear edge of the first opening, the hinge assembly is a four-bar assembly, the four-bar assembly is arranged at the third rim and the fourth rim of the top door, and the top door is hinged to the vehicle body top portion by the four-bar assembly.

In an embodiment, the vehicle door system further includes a sealing member, wherein the sealing member includes a top doorway sealing member and a side doorway sealing member, the top doorway sealing member is provided at the rim of the top doorway, and the side doorway sealing member is provided at the rim of the side doorway.

In an embodiment, the vehicle door system further includes an obstacle detector and a vehicle door controller, wherein the obstacle detector is provided on any one of the top door, the side door, and the vehicle body, and configured to detect whether there is an obstacle in an opening and closing stroke of the top door and/or the side door; and the vehicle door controller is provided on any one of the top door, the side door, and the vehicle body, and is configured to control movement of at least one of the side door, the top door, and the side window.

In a second aspect, an embodiment of the present invention provides control method of a vehicle door system, including:

detecting whether a door opening request is received, wherein the door opening request is configured to request a top door and/or a side door body to be opened:

detecting, in case that the door opening request is received, whether a distance between a top edge of a side window and a first rim of the top door reaches a predetermined distance; and sending, in case that the predetermined distance is reached, an opening signal, wherein the opening signal is configured to control the top door and/or the side door body to be opened.

In an embodiment, the detecting, in case that the door opening request is received, whether the distance between the top edge of the side window and the first rim of the top door reaches the predetermined distance, includes;

detecting, in case that a first door opening request is received, whether the distance between the top edge of the side window and the first rim of the top door reaches a first predetermined distance, wherein the first door opening request is configured to request the side door body to be opened; and the sending, in case that the predetermined distance is reached, an opening signal, includes:

sending, in case that the first predetermined distance is reached, a first opening signal, wherein the first opening signal is configured to control the side door body to be opened.

In an embodiment, the sending, in case that the predetermined distance is reached, the opening signal, further includes:

sending, in case that the first predetermined distance is not reached, a first lowering signal, wherein the first lowering signal is configured to control the side window to be lowered, so that the distance between the top edge of the side window and the first rim of the top door reaches the first predetermined distance.

In an embodiment, the detecting, in case that the door opening request is received, whether the distance between the top edge of the side window and the first rim of the top door reaches the predetermined distance, includes;

detecting, in case that a second door opening request is received, whether the distance between the top edge of the side window and the first rim of the top door reaches a second predetermined distance, wherein the second door opening request is configured to request the top door to be opened, and the second predetermined distance is greater than the first predetermined distance; and the sending, in case that the predetermined distance is reached, the opening signal, includes:

sending, in case that the second predetermined distance is reached, a second opening signal, wherein the second opening signal is configured to control the top door to be opened.

In an embodiment, the sending, in case that the predetermined distance is reached, the opening signal, further includes:

detecting, in case that the second predetermined distance is not reached, whether the side door body is opened by a first predetermined angle; and sending, in case that the side door body is opened by the first predetermined angle, the second opening signal.

In an embodiment, the method further includes:

sending, in case that the side door body is not opened by the first predetermined angle, a second lowering signal, wherein the second lowering signal is configured to control the side window to be lowered, so that the distance between the top edge of the side window and the first rim of the top door reaches the second predetermined distance.

In an embodiment, the method further includes:

detecting, in case that the second predetermined distance is reached, whether the distance between a corner window top rim and an edge of a fourth opening reaches a predetermined lowering distance of the corner window; and sending, in case that the lowering distance of the corner window is reached, the second opening signal.

In an embodiment, the method further includes:

sending, in case that the lowering distance of the corner window is not reached, a corner window lowering signal, wherein the corner window lowering signal is configured to control the corner window to be lowered, so that the distance between the corner window top rim and the edge of the fourth opening reaches the lowering distance of the corner window.

In an embodiment, the method further includes:

detecting whether an early warning signal sent by an obstacle detector is received, wherein the early warning signal is configured to prompt that there is an obstacle in an opening stroke of the top door and/or the side door body; and sending, in case that the early warning signal is received, a stop signal, wherein the stop signal is configured to control the top door and/or the side door body to stop opening.

In a third aspect, an embodiment of the present invention provides a control method of a vehicle door system, including:

detecting whether a door closing request is received, wherein the door closing request is configured to request a top door and/or a side door body to be closed:

detecting, in case that the door closing request is received, whether a distance between an top edge of a side window and a first rim of the top door reaches a predetermined distance; and sending, in case that the predetermined distance is reached, a closing signal, wherein the closing signal is configured to control the top door and/or the side door body to be closed.

In an embodiment, the method further includes:

sending, in case that the predetermined distance is not reached, a lowering signal, wherein the lowering signal is configured to control the side window to be lowered, so that the distance between the top edge of the side window and the first rim of the top door reaches the predetermined distance.

In an embodiment, the method further includes:

detecting whether the side door body and the top door are closed in place; and sending, in case that the side door body and the top door are closed in place, a side window raising signal, wherein the side window raising signal is configured to control the side window to raise.

In an embodiment, the method further includes:

detecting whether an early warning signal sent by an obstacle detector is received, wherein the early warning signal is configured to prompt that there is an obstacle in a closing stroke of the top door and/or the side door body; and sending, in case that the early warning signal is received, a stop signal, wherein the stop signal is configured to control the top door and/or the side door body to stop closing.

In a fourth aspect, an embodiment of the present invention provides a vehicle, including the vehicle door system according to the first aspect of the present invention.

All the above technical solutions have the following advantages or beneficial effects: the convenience for the passenger or the driver to get on and off may be improved while satisfying the design of making the vehicle body low.

DETAILED DESCRIPTION

Figure 1:
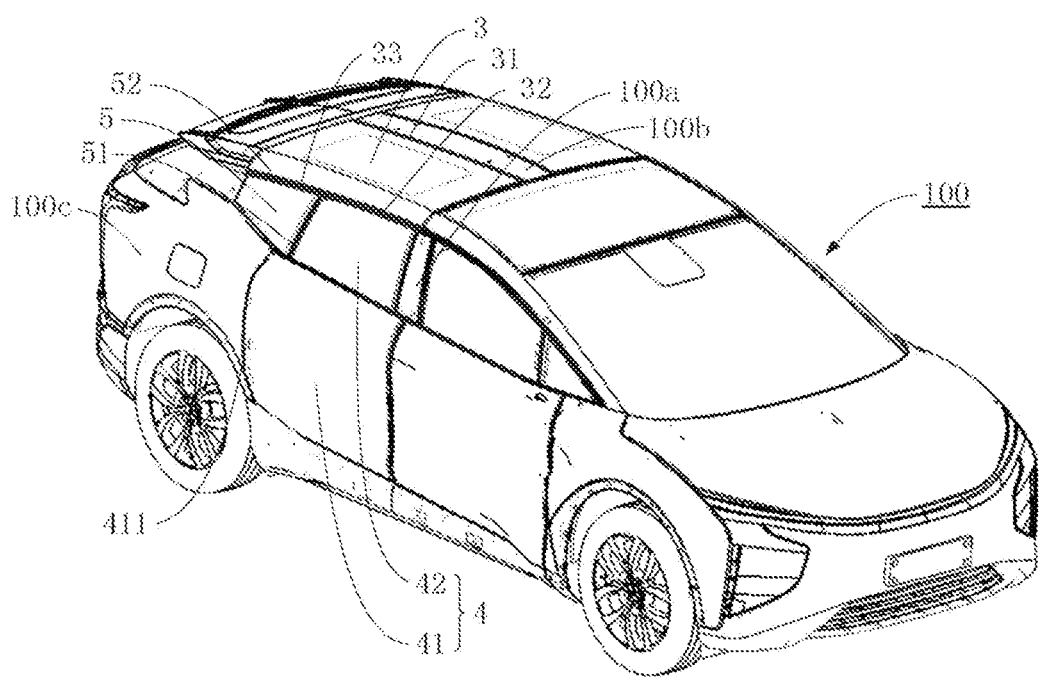
FIG. 1 is a structural schematic view of a vehicle door system in accordance with an embodiment of the present invention.

A vehicle door system in accordance with an embodiment in a first aspect of the present invention is described below with reference to FIG. 1-FIG. 18. The vehicle door system in the embodiment of the present invention may be mounted to a vehicle body 100 of a vehicle.

As shown in FIG. 1-FIG. 18, a vehicle door system in an embodiment of the present invention includes a top door 3 and a side door 4.

Specifically, the top door 3 opens and closes a first opening (a top doorway 11) of a vehicle body top portion 100b. The side door 4 includes a side door body 41 and a side window 42, wherein the side door body 41 opens and closes a second opening 12aa of a side skirt 100a of the vehicle body 100, the side window 42 is mounted on the side door body 41, a top edge and a side edge of the side window 42 are configured to be frameless, when the side door body 41 closes the second opening, the side window 42 can raise and lower relative to the side door body 41, so as to close or open a third opening 12ab of the side skirt 100a of the vehicle body 100, wherein the third opening 12ab is located above the second opening 12aa, the second opening 12aa and the third opening 12ab are interconnected to form a side doorway 12, and the first opening (top doorway 11), the second opening 12aa, and the third opening 12ab are interconnected.

Besides, the top door 3 has a fifth rim 31 connected to the vehicle body top portion 100b, and the top door 3 opens and closes the first opening of the vehicle body top portion 100b with the fifth rim 31 as a rotating shaft; the side door body 41 may have a sixth rim 411 connected to the side skirt 100a of the vehicle body 100, and the side door body 41 opens and closes the second opening 12aa on the side of the vehicle body 100 with the sixth rim 411 as a rotating shaft.

It may be understood that the side window 42 may be provided above the side door body 41, and the side window 42 may raise and lower relative to the side door body 41. By controlling the side window 42 to raise and lower, the third opening 12ab is opened or closed. It should be noted that, "frameless" might be understood by those skilled in the art, i.e. an upper half of the side door 4 (opening position of side window 42) is provided in a frameless form, only with vehicle door glass, that is to say, the side window 42 may be separately made of a whole piece of glass and telescopically provided on the side door body 41.

In one example, the top door 3 may be made of glass. In other examples, the top door 3 may also be made of metallic materials or other non-metallic materials, which is not specifically limited in the present invention.

According to the vehicle door system in the embodiment of the present invention, by configuring the top edge and the side edge of the side window 42 as frameless structures, the top door 3 and the side door body 41 can be opened separately by controlling the side window 42 to raise and lower; besides, in a situation that the side door body 41 closes the second opening 12aa, a vehicle door opening mode in which the third opening 12ab is opened separately or the first opening and the third opening 12ab are opened simultaneously may be realized, thereby making the opening mode of the vehicle door system more flexible, satisfying various use requirements of the driver or the passenger, and obtaining a larger field of view. Further, in a mode in which both the top door 3 and the side door body 41 are opened simultaneously, a space for the driver or the passenger to get on and off may be increased, facilitating entering and exiting the vehicle body 100.

For the vehicle in the related art, water easily enters the vehicle body from positions of door slits when it rains or cleaning the vehicle. Since the vehicle door and the doorway are divided into different parts, it is difficult to make the vehicle door waterproof.

Figure 5:
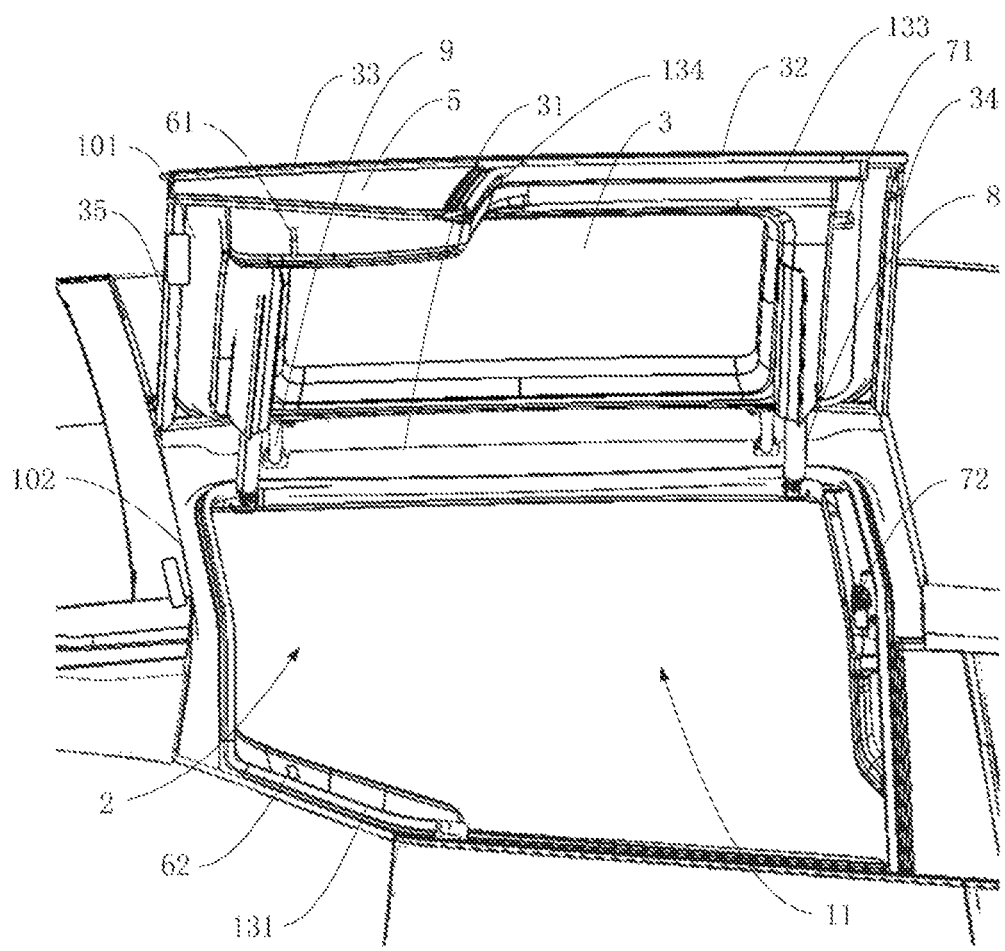
FIG. 5 is a structural schematic view of the vehicle door system in accordance with an embodiment of the present invention.

In order to avoid this problem, as shown in FIG. 5, in the vehicle door system of an embodiment of the present invention, a top doorway sealing member 131 is provided at a rim of the top doorway 11, a side doorway sealing member 132 is provided at a rim of the side doorway 12, and the top doorway sealing member 131 and the side doorway sealing member 132 are connected to form a closed ring for sealing an outer rim of a doorway 1. When the top door 3 is closed, a sealing member 133 on a first rim 32 of the top door 3 and the top doorway sealing member 131 and/or a sealing member 134 on a corner window side rim are connected to form a closed ring, and together constitute a seal for the top doorway 11; and the sealing member 133 on the first rim of the top door 3 and the side doorway sealing member 132 and/or the sealing member 134 on the corner window side rim are connected to form a closed ring, and together constitute a seal for the side doorway 12.

Figure 4:
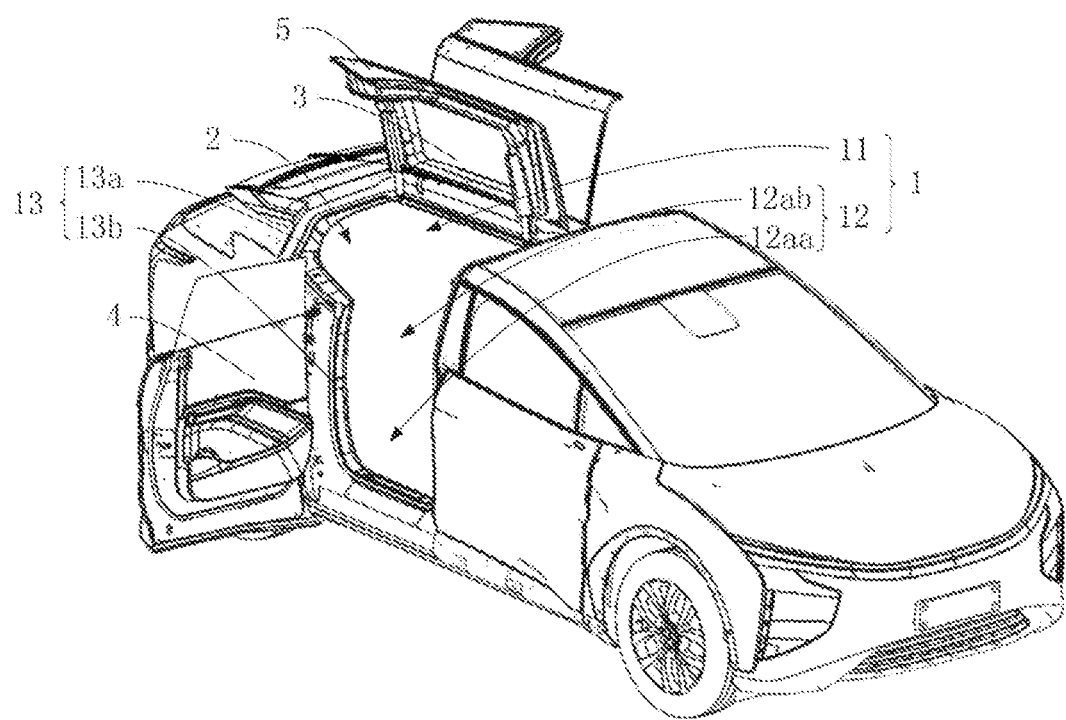
FIG. 4 is a structural schematic view of the vehicle door system in accordance with an embodiment of the present invention.

In an embodiment, as shown in FIG. 4, the vehicle body 100 has the doorway 1, and the doorway 1 includes the top doorway 11 and the side doorway 12, wherein the first opening is formed in the top doorway 11, and the second opening 12aa and the third opening 12ab are formed in the side doorway 12.

Specifically, the vehicle body 100 includes the side skirt 100a, the vehicle body top portion 100b, and a vehicle body tail portion 100c. The top doorway 11 is formed in the vehicle body top portion 100b, and the side doorway 12 is formed in the vehicle body side skirt 100a. The side door 4 is connected to an edge of the side doorway 12 so as to open and close the side doorway 12, and the top door 3 is connected to an edge of the top doorway 11 so as to open and close the top doorway 11.

In use, the top door 3 and the side door 4 may act simultaneously so as to open the top doorway 11 and the side doorway 12 simultaneously, or to close the top doorway 11 and the side doorway 12 simultaneously, or to close one of the top doorway 11 and the side doorway 12 while opening the other. The top door 3 and the side door 4 may also act separately, so that in the process that one of the top doorway 11 and the side doorway 12 is opened or closed, the other is maintained in an open or closed state.

Further, the top door 3 and the side door 4 may act separately, then when the passenger or the driver gets on and off in fine weather, the top door 3 and the side door 4 may be opened simultaneously, thus facilitating the passenger or the driver in getting on and off. When the passenger or the driver gets on and off in rain or snow, only the side door 4 may be operated so as to open the side door 4 or close the side doorway 12, while the top door 3 is not operated at the same time, so that the top doorway 11 is always in the closed state, further avoiding rain and snow from entering the vehicle body 100 from the top doorway 11 in the open state. Besides, the top door 3 may also be opened separately so as to realize a skylight function.

It should be noted that for vehicles having the butterfly door, the top cover door, the gull wing door, and the falcon wing door in the related art, as the top structure and the side structure of the doors are connected, the top portion and the side portion are required to be opened simultaneously to realize opening of the vehicle door, then when the vehicle door is opened in rain and snow, rain and snow will enter the vehicle body from the opened top portion. Further, water often accumulates on the top door of the vehicles in the related art, then when the top door is started to open the first opening after rain and snow, the accumulated water usually will enter the vehicle body from positions of edges of the top door and the first opening, thus causing contamination to the inside of the vehicle body.

However, according to the vehicle door system in an embodiment of the present invention, the top door 3 and the side door 4 may act separately, and in cases of rain and snow and water accumulation after rain, a vehicle sensor can be used for detection, and the top door 3 is controlled, by logic built in a vehicle door controller, not to be opened in a corresponding scenario, and only the side door 4 is opened separately. This not only can avoid the rain and snow from entering the vehicle body 100 from between edges of the top door 3 and the first opening when the top door 3 closes the first opening, but also can avoid the accumulated water on the top door 3 from entering the vehicle body 100 from between edges of the top door 3 and the first opening in the process of the top door 3 opening the first opening.

It should be noted that for vehicles having the butterfly door, the top cover door, the gull wing door, and the falcon wing door in the related art, as the top structure and the side structure of the doors are connected, the top portion and the side portion are required to be opened simultaneously to realize opening of the vehicle door, therefore, after occurrence of rollover accidents, the vehicle door is hardly opened completely as the vehicle top part is pressed or due to other reasons, then it is hard to carry out rescue. However, according to the vehicle door system in the embodiment of the present invention, the top door 3 and the side door 4 may act separately, then when carrying out rescue in case that a rollover accident occurs, it is possible to open only the top door 3 or the side door 4, which is not quite restricted by the space or other factors, then rescue is easier to implement.

Moreover, the butterfly door, the top cover door, the gull wing door, and the falcon wing door in the related art, when being opened and closed, usually perform a turnover movement around a horizontal direction of the vehicle, then the vehicle doors cannot be used for storage. However, in the present embodiment, as the top door 3 and the side door 4 are provided separately, a storage space may be provided on the side door 4 to facilitate storage.

In some embodiments, as shown in FIG. 1-FIG. 16, the vehicle body 100 has a central plane that extends in a length direction and a height direction of the vehicle body 100, and the vehicle body 100 is mirror-symmetrical with respect to this central plane as a plane of symmetry. This enables the passenger or the driver to get on and off from two sides of the vehicle body 100, moreover, the symmetrical structure of the vehicle body 100 further facilitates the manufacture of vehicles.

There may be multiple doorways 1 and they are provided on two sides of the vehicle body 100, respectively. It should be noted that the doorways 1 on the two sides of the vehicle body 100 may be provided in a symmetrical form with respect to the central plane, and also may be provided in a staggered form with respect to the central plane.

In order that the vehicle body 100 can have a large open space at the vehicle body top portion 100b through the top doorway 11, preferably, there are two side skirts 100a, and the two side skirts 100a are located at two opposite sides of the vehicle body 100, respectively.

Figure 6:
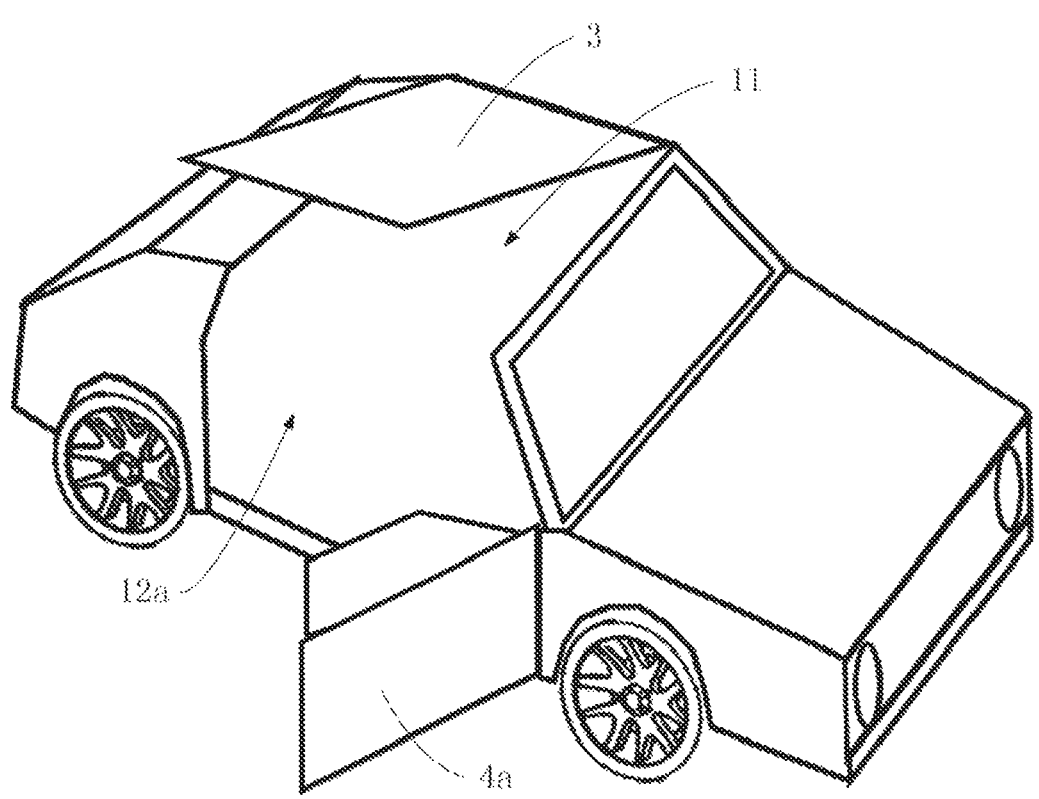
FIG. 6 is a structural schematic view of the vehicle door system in accordance with an embodiment of the present invention.

In an embodiment, as shown in FIG. 6, the side doorway 12 includes a first side doorway 12a and a second side doorway that are symmetrically provided, and the second side doorway is provided symmetrically to the first side doorway 12a in a left-right direction of the vehicle body 100. The side door 4 includes a first side door 4a and a second side door that are symmetrically provided, and the second side door is provided symmetrically to the first side door in the left-right direction of the vehicle body 100, the first side door 4a is configured to open and close the first side doorway 12a, and the second side door is configured to open and close the second side doorway. The top door 3 is connected to a top edge of the first side doorway 12a or a top edge of the second side doorway.

Specifically, the first side doorway 12a and the second side doorway are provided on the two side skirts 100a, respectively, and the top doorway 11 extends from a position where one side skirt 100a is located to a position where the other side skirt 100a is located. In this way, when the top doorway 11 is fully opened, the vehicle body top portion 100b has a portion that is fully opened or nearly fully opened in a width direction of the vehicle, thus the vehicle body top portion 100b has a relatively large open space.

Figure 7:
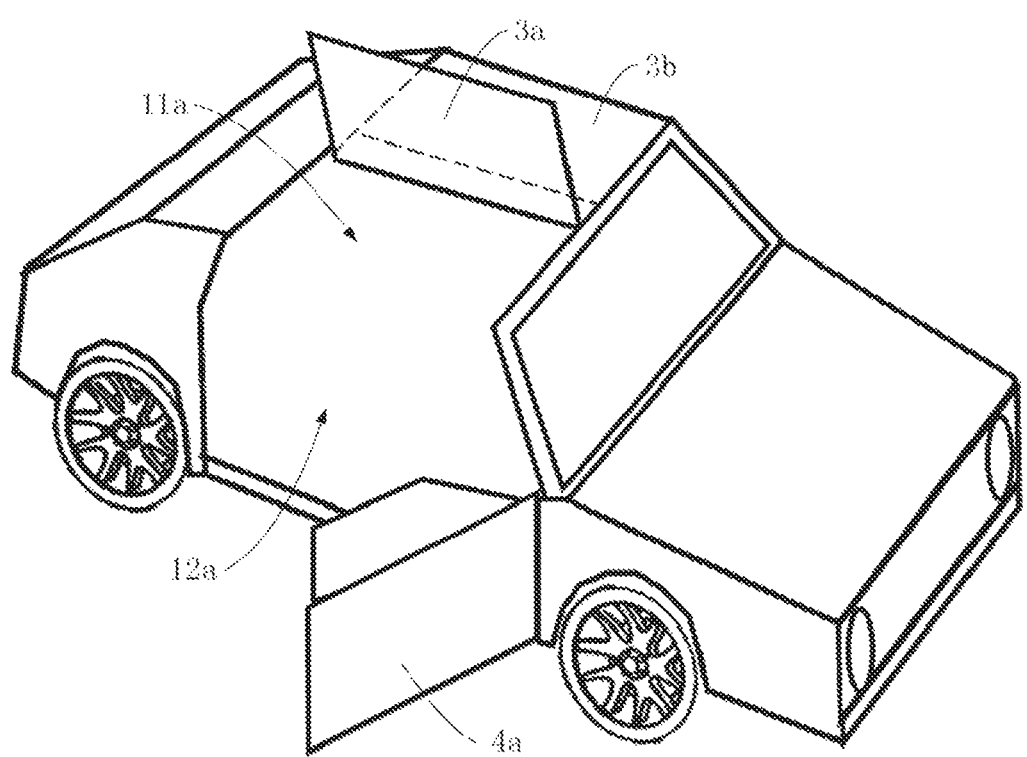
FIG. 7 is a structural schematic view of the vehicle door system in accordance with an embodiment of the present invention.

In another embodiment, as shown in FIG. 7, the doorway 1 includes a first doorway 1a and a second doorway that are symmetrically provided, wherein the first doorway 1a includes a first top doorway 11a and a first side doorway 12a, the second doorway includes a second top doorway and a second side doorway, and the first top doorway 11a and the second top doorway are arranged at an interval. The side door 4 includes a first side door 4a and a second side door that are symmetrically provided, wherein the first side door 4a is configured to open and close the first side doorway 12a, and the second side door is configured to open and close the second side doorway. The top door 3 includes a first top door 3a and a second top door 3b, the first top door 3a is configured to open or close the first top doorway 11a separately, and the second top door 3b is configured to open or close separately.

It may be understood that the first top doorway 11a and the second top doorway are symmetrically provided on the vehicle body top portion 100b, and the first top doorway 11a and the second top doorway are provided at an interval, wherein the first top doorway 11a is interconnected with the first side doorway 12a, and the second top doorway is interconnected with the second side doorway. The first top door 3a may be connected to an edge of the first top doorway 11a away from the first side doorway 12a, and the second top door 3b may be connected to an edge of the second top doorway away from the second side doorway. Thus, the first top doorway 11a and the second top doorway may be opened and closed separately by controlling the first top door 3a and the second top door 3b.

In some embodiments, as shown in FIG. 8-FIG. 18, the vehicle body 100 has therein both a front row driving space and a rear row passenger space, so that the driver in the front row and the passenger in the rear row can conveniently get into and out of the vehicle body 100, and meanwhile, rain and snow also can be avoided from falling into the vehicle body 100.

Figure 11:
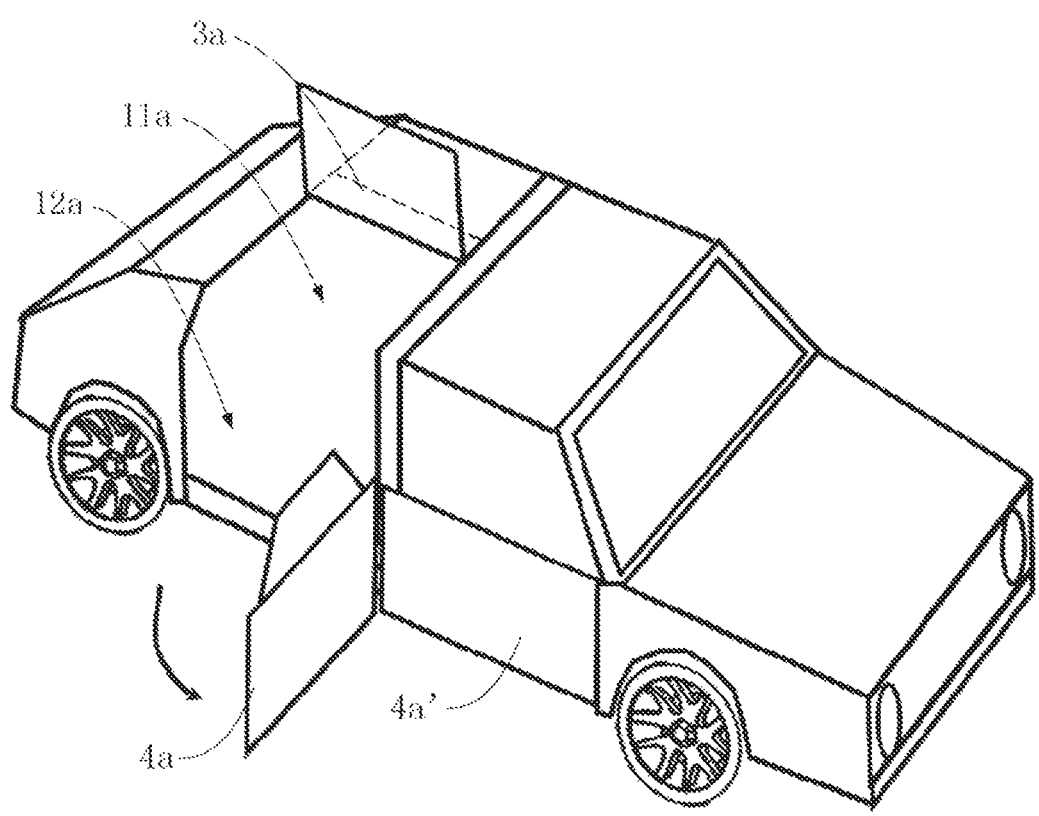
FIG. 11 is a structural schematic view of the vehicle door system in accordance with an embodiment of the present invention.
Figure 12A:
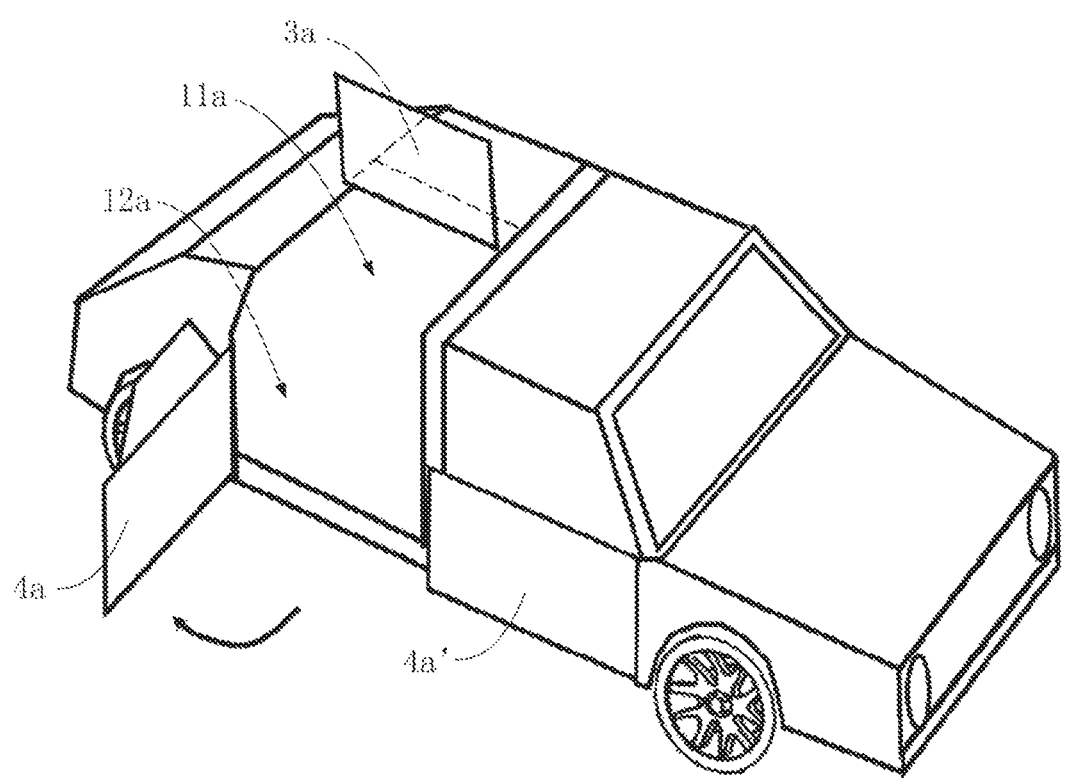
FIG. 12A is a structural schematic view of the vehicle door system in accordance with an embodiment of the present invention.
Figure 12B:
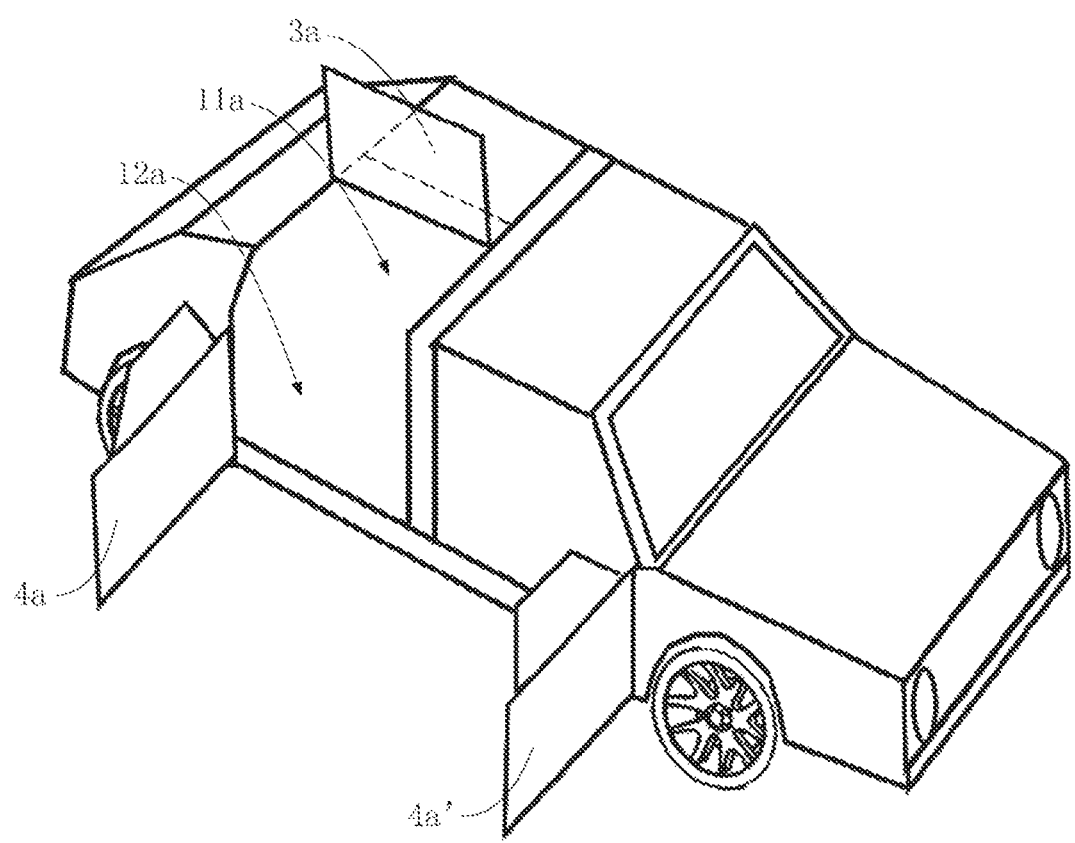
FIG. 12B is a structural schematic view of the vehicle door system in accordance with an embodiment of the present invention.

In an embodiment, as shown in FIG. 11, FIG. 12A, and FIG. 12B, the vehicle door system further includes a first front door 4a' and a second front door, wherein the first front door 4a' is located between a vehicle body head portion and the first side door 4a, and the second front door is located between the vehicle body head portion and the second side door. Wherein, opening directions of the first side door 4a and the first front door 4a' are the same or opposite, and opening directions of the second side door and the second front door are the same or opposite. It may be understood that the first front door 4a' and the second front door are located in the front row driving space, and the first side door 4a and the second side door are located in the rear row passenger space.

In one example, as shown in FIG. 11, rotating shafts of the first front door 4a' and the second front door rotating relative to the side skirt 100a are respectively located on the side of the first front door 4a' and the side of the second front door adjacent to the vehicle body head portion, and rotating shafts of the first side door 4a and the second side door rotating relative to the side skirt 100a are respectively located on the side of the first side door 4a and the side of the second side door adjacent to the vehicle body head portion, so that the opening directions of the first front door 4a' and the first side door 4a are the same, and the opening directions of the second front door and the second side door are the same. It should be noted that in other examples, the rotating shafts of the first front door 4a' and the second front door rotating relative to the side skirt 100a may be respectively located on the side of the first front door 4a' and the side of the second front door away from the vehicle body head portion, and the rotating shafts of the first side door 4a and the second side door rotating relative to the side skirt 100a are respectively located on the side of the first side door 4a and the side of the second side door away from the vehicle body head portion.

In another example, as shown in FIG. 12A and FIG. 12B, the rotating shafts of the first front door 4a' and the second front door rotating relative to the side skirt 100a are respectively located on the side of the first front door 4a' and the side of the second front door adjacent to the vehicle body head portion, and the rotating shafts of the first side door 4a and the second side door rotating relative to the side skirt 100a are respectively located on the side of the first side door 4a and the side of the second side door away from the vehicle body head portion, so that the opening directions of the first front door 4a' and the first side door 4a are opposite, and the opening directions of the second front door and the second side door are opposite.

In an embodiment, the doorway 1 includes at least one pair of first doorway 1a and second doorway that are symmetrically provided, the second doorway is provided symmetrically to the first doorway 1a in the left-right direction of the vehicle body 100, and at least one pair of third doorway 1c and fourth doorway that are symmetrically provided, and the fourth doorway is provided symmetrically to the third doorway 1c in the left-right direction of the vehicle body 100. Wherein, the third doorway 1c and the fourth doorway are located between the first doorway 1a and the second doorway and the vehicle body tail portion 100c, the first doorway 1a and the second doorway are interconnected with the front row driving space, and the third doorway 1c and the fourth doorway are interconnected with the rear row passenger space.

Wherein, the first doorway 1a has a first top doorway 11a and a first side doorway 12a, the second doorway includes a second top doorway and a second side doorway, the third doorway 1c includes a third top doorway 11c and a third side doorway 12c, and the fourth doorway includes a fourth top doorway and a fourth side doorway. The top door 3 includes a first top door 3a, a second top door 3b, a third top door 3c, and a fourth top door 3d provided corresponding to the first top doorway 11a, the second top doorway, the third top doorway 11c, and the fourth top doorway, respectively.

Specifically, the first side doorway 12a and the third side doorway 12c are provided on the side skirt 100a on one side of the vehicle body 100, and the second side doorway and the fourth side doorway are provided on the side skirt 100a on the other side of the vehicle body 100. The first top door 3a, the second top door 3b, the third top door 3c, and the fourth top door 3d each have a covering surface so as to cover the first top doorway 11a, the second top doorway, the third top doorway 11c, and the fourth top doorway, respectively.

Figure 8:
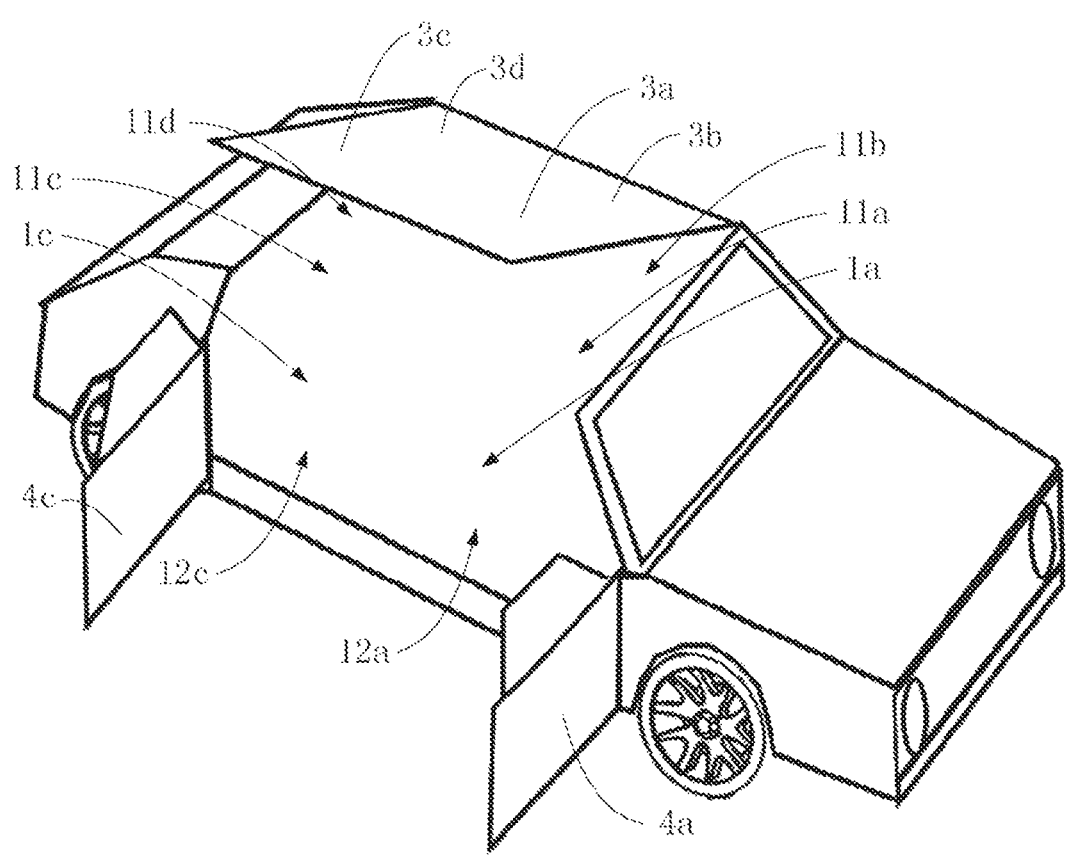
FIG. 8 is a structural schematic view of the vehicle door system in accordance with an embodiment of the present invention.

In an embodiment, as shown in FIG. 8, the first top doorway 11a, the second top doorway 11b, the third top doorway 11c, and the fourth top doorway 11d are interconnected, and the first top door 3a, the second top door 3b, the third top door 3c, and the fourth top door 3d are an integral member so as to simultaneously open or close the first top doorway 11a, the second top doorway 11b, the third top doorway 11c, and the fourth top doorway 11d.

It should be noted that the second top doorway 11b and the second side doorway, and the fourth top doorway 11d and the fourth side doorway are provided at intervals, the integral member constituted by the first top door 3a, the second top door 3b, the third top door 3c, and the fourth top door 3d is hinged to an edge of the second top doorway 11b adjacent to the second side doorway and an edge of the fourth top doorway 11d adjacent to the fourth side doorway, so that the integral member may simultaneously open or close the first top doorway 11a, the second top doorway 11b, the third top doorway 11c, and the fourth top doorway 11d.

Figure 9:
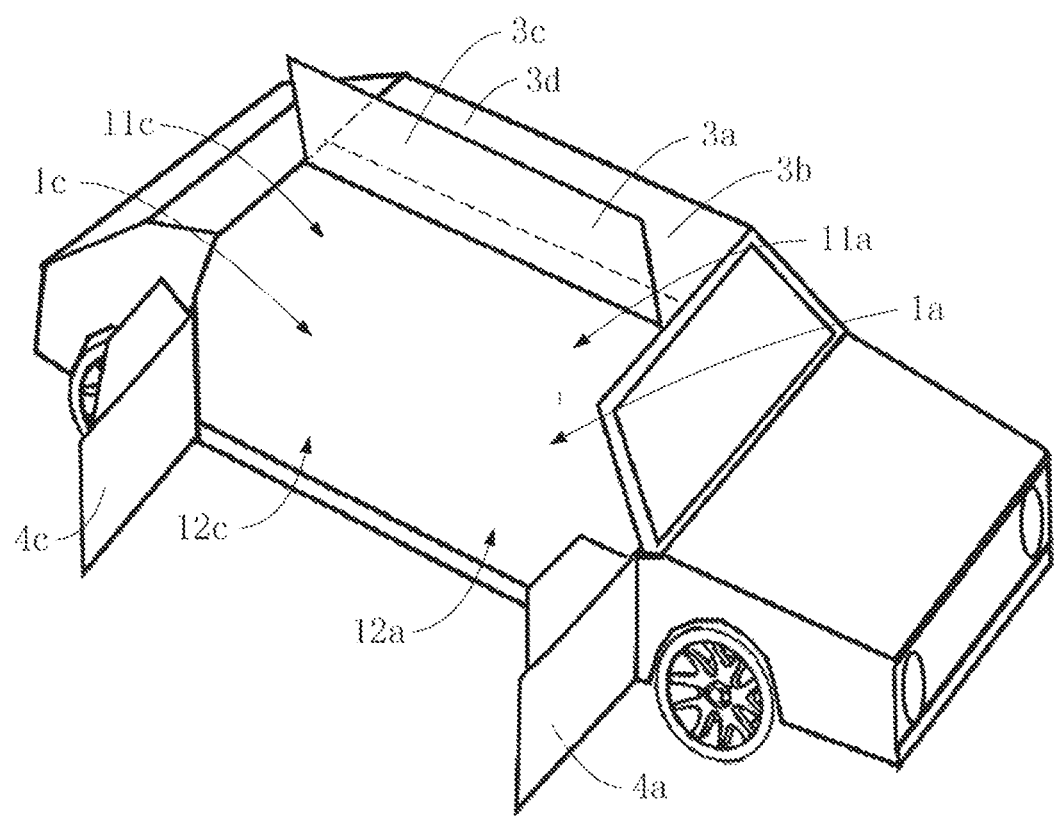
FIG. 9 is a structural schematic view of the vehicle door system in accordance with an embodiment of the present invention.

In an embodiment, as shown in FIG. 9, the first top doorway 11a, the second top doorway, the third top doorway 11c, and the fourth top doorway are provided at intervals. Wherein, the second top doorway is provided symmetrically to the first top doorway 11a in the left-right direction of the vehicle body 100, and the fourth top doorway is provided symmetrically to the third top doorway 11c in the left-right direction of the vehicle body 100. The first top door 3a and the third top door 3c are an integral member so as to simultaneously open or close the first top doorway 11a and the third top doorway 11c, and the second top door 3b and the fourth top door 3d are an integral member so as to simultaneously open or close the second top doorway and the fourth top doorway.

Specifically, at least one of the first top door 3a and the third top door 3c may be hinged to an edge of the first top doorway 11a away from the first side doorway 12a and/or hinged to an edge of the third top doorway 11c away from the third side doorway 12c, and at least one of the second top door 3b and the fourth top door 3d may be hinged to an edge of the second top doorway away from the second side doorway and/or hinged to an edge of the fourth top doorway away from the fourth side doorway.

Figure 10:
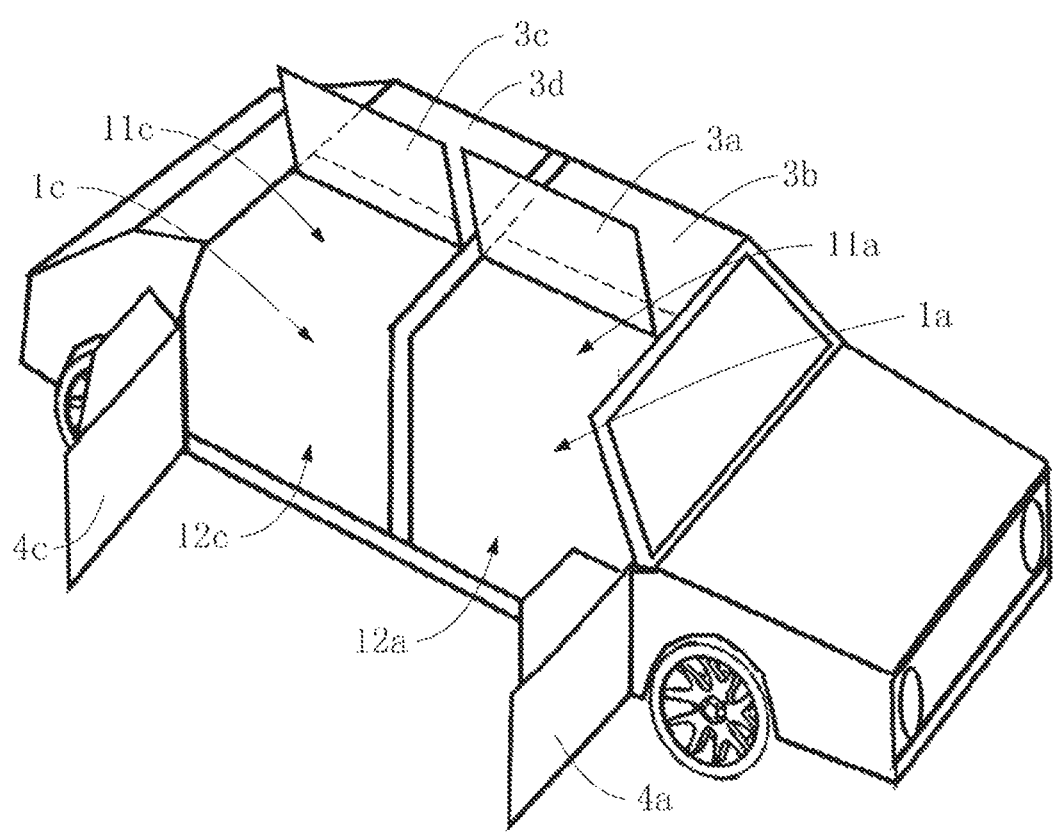
FIG. 10 is a structural schematic view of the vehicle door system in accordance with an embodiment of the present invention.

In an embodiment, as shown in FIG. 10, the first top doorway 11a, the second top doorway, the third top doorway 11c, and the fourth top doorway are provided at intervals, and the first top door 3a, the second top door 3b, the third top door 3c, and the fourth top door 3d are separate members to each other. Wherein, the second top doorway is provided symmetrically to the first top doorway 11a in the left-right direction of the vehicle body 100, and the fourth top doorway is provided symmetrically to the third top doorway 11c in the left-right direction of the vehicle body 100. The first top door 3a is configured to separately open or close the first top doorway 11a, the second top door 3b is configured to separately open or close the second top doorway, the third top door 3c is configured to separately open or close the third top doorway 11c, and the fourth top door 3d is configured to separately open or close the fourth top doorway.

Specifically, the first top doorway 11a and the first side doorway 12a are interconnected, the second top doorway and the second side doorway are interconnected, the third top doorway 11c and the third side doorway 12c are interconnected, and the fourth top doorway and the fourth side doorway are interconnected. The first top door 3a is hinged to an edge of the first top doorway 11a away from the first side doorway 12a, the second top door 3b is hinged to an edge of the second top doorway away from the second side doorway, the third top door 3c is hinged to an edge of the third top doorway 11c away from the third side doorway 12c, and the fourth top door 3d is hinged to an edge of the fourth top doorway away from the fourth side doorway.

In an embodiment, as shown in FIG. 10, the side door 4 includes a first side door 4a, a second side door, a third side door 4c, and a fourth side door that are provided corresponding to the first side doorway 12a, the second side doorway, the third side doorway, and the fourth side doorway, respectively, wherein the opening directions of the first side door 4a and the third side door 4c are the same or opposite, and the opening directions of the second side door and the fourth side door are the same or opposite. The second side door is provided symmetrically to the first side door 4a in the left-right direction of the vehicle body 100, and the fourth side door is provided symmetrically to the third side door 4c in the left-right direction of the vehicle body 100.

For example, the opening directions of the first side door 4a and the third side door 4c are the same, and the opening directions of the second side door and the fourth side door are the same. Specifically, the first side door 4a may be hinged to an edge of a side of the first side doorway 12a adjacent to the vehicle body tail portion 100c, the third side door 4c may be hinged to an edge of a side of the third side doorway 12c adjacent to the vehicle body tail portion 100c, the second side door may be hinged to an edge of a side of the second side doorway adjacent to the vehicle body tail portion 100c, and the fourth side door may be hinged to an edge of a side of the fourth side doorway adjacent to the vehicle body tail portion 100c.

Preferably, as shown in FIG. 10, the opening directions of the first side door 4a and the third side door 4c are opposite, and the opening directions of the second side door and the fourth side door are opposite. Specifically, the first side door 4a may be hinged to an edge of a side of the first side doorway 12a adjacent to the vehicle body tail portion 100c, the third side door 4c may be hinged to an edge of a side of the first side doorway 12a away from the vehicle body tail portion 100c, the second side door may be hinged to an edge of a side of the second side doorway adjacent to the vehicle body tail portion 100c, and the fourth side door may be hinged to an edge of a side of the fourth side doorway away from the vehicle body tail portion 100c. Thus, when one of the first side door 4a and the third side door 4c is opened, or when one of the second side door and the fourth side door is opened, the driver or the passenger will not be influenced from getting into or out of the vehicle body 100 from the other corresponding doorway.

In some embodiments, as shown in FIGS. 13-16, a corner window portion 2 (i.e., a fourth opening interconnected with the third opening 12ab) is further formed on the side skirt 100a, and the vehicle door system in an embodiment of the present invention further includes a corner window 5 provided at the corner window portion 2.

In some cases, the passenger or the driver may wish to obtain a certain field of view through the corner window 5, and have a relatively wide space for getting on and off, but it is undesired that the corner window portion 2 is opened when the top door 3 opens the top doorway 11.

Figure 13:
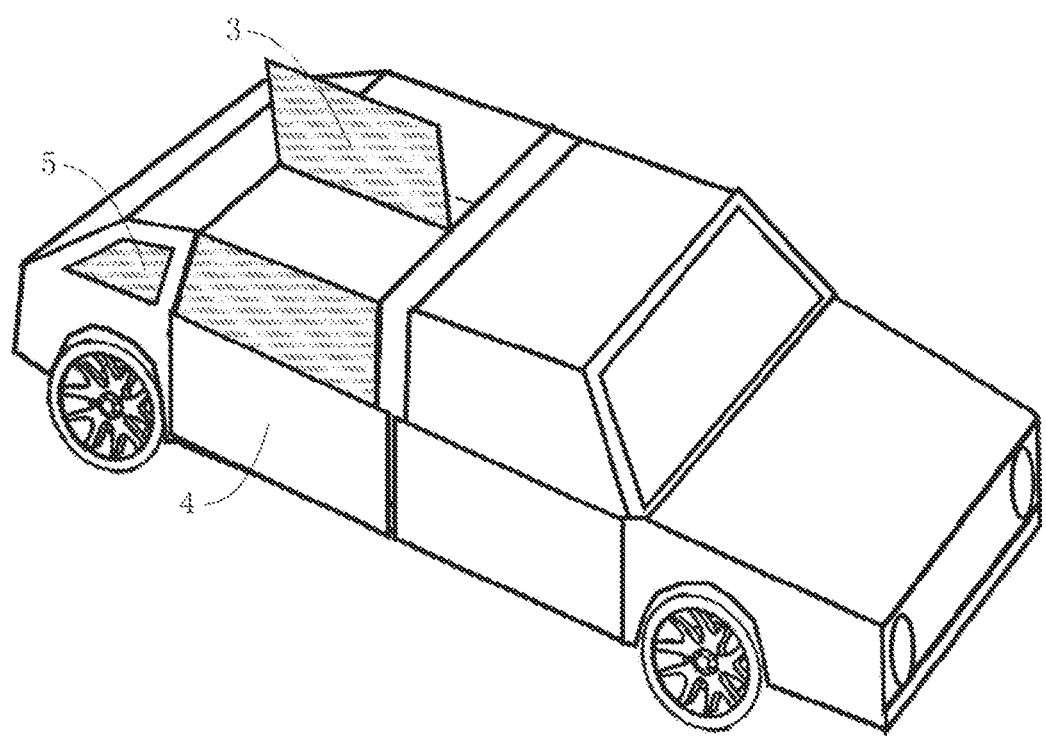
FIG. 13 is a structural schematic view of the vehicle door system in accordance with an embodiment of the present invention.
Figure 14:
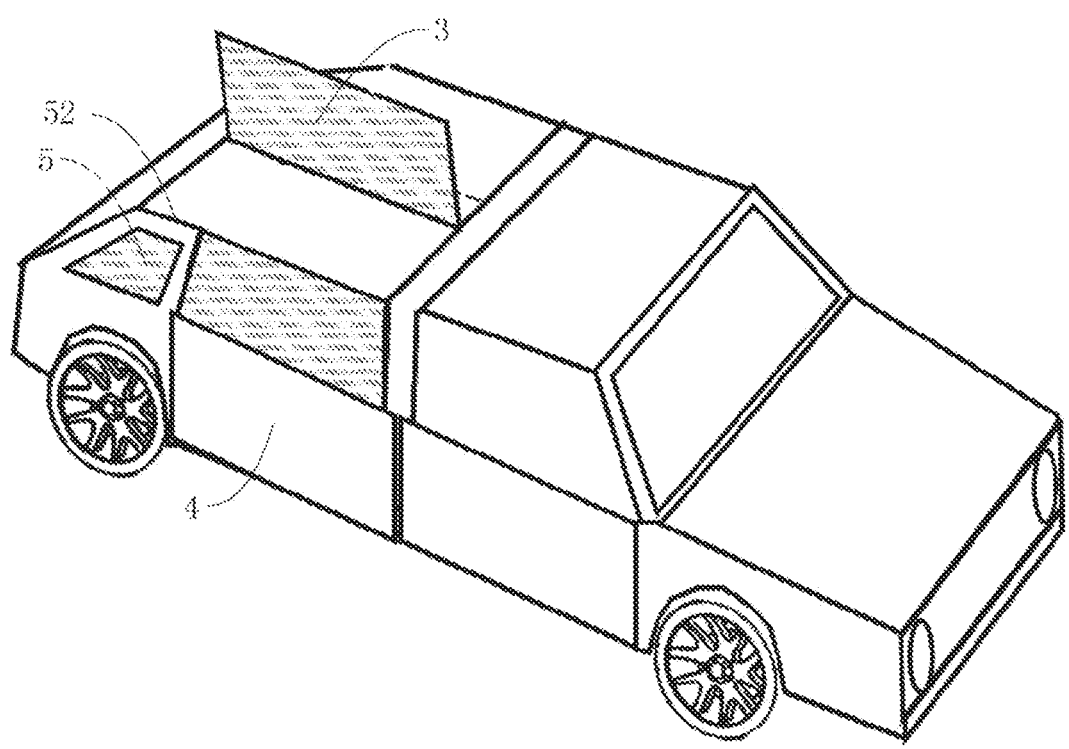
FIG. 14 is a structural schematic view of the vehicle door system in accordance with an embodiment of the present invention.

In order to satisfy this requirement of the passenger or driver, in some embodiments, the corner window 5 is mounted at the edge of the corner window portion 2, i.e. intersection between the corner window portion 2 and the side skirt 100a, as shown in FIGS. 13 and 14. The corner window is fixed onto the side skirt 100a. The corner window 5 has a corner window top rim 52, and the corner window top rim 52 forms a portion of the edge of the top doorway 11. This enables the top doorway 11 to extend in the length direction of the vehicle body 100 to the corner window top rim 52 of the corner window 5, thus increasing the degree to which the top doorway 11 can be opened, and further providing a relatively wide space for the passenger driver to get on and off. Meanwhile, when the top door 3 moves, it is unnecessary for the corner window 5 to move simultaneously, which satisfies the needs of the passenger or the driver, for example, protecting privacy.

Figure 15:
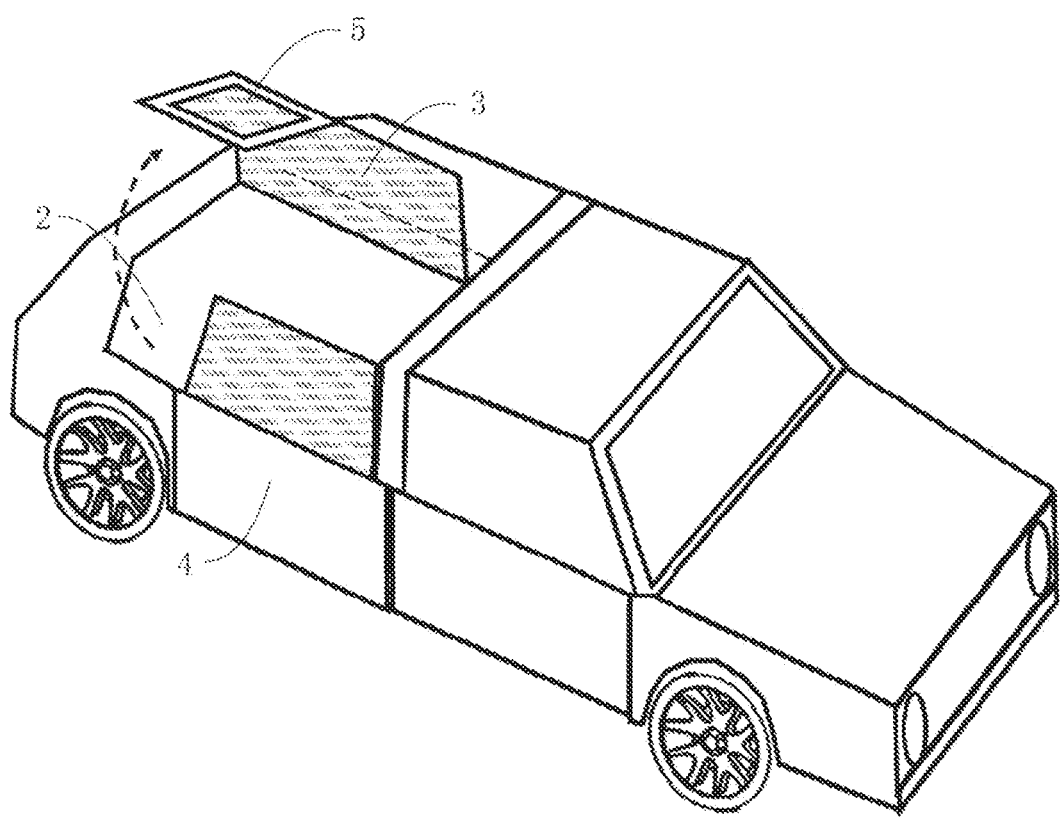
FIG. 15 is a structural schematic view of the vehicle door system in accordance with an embodiment of the present invention.
Figure 16A:
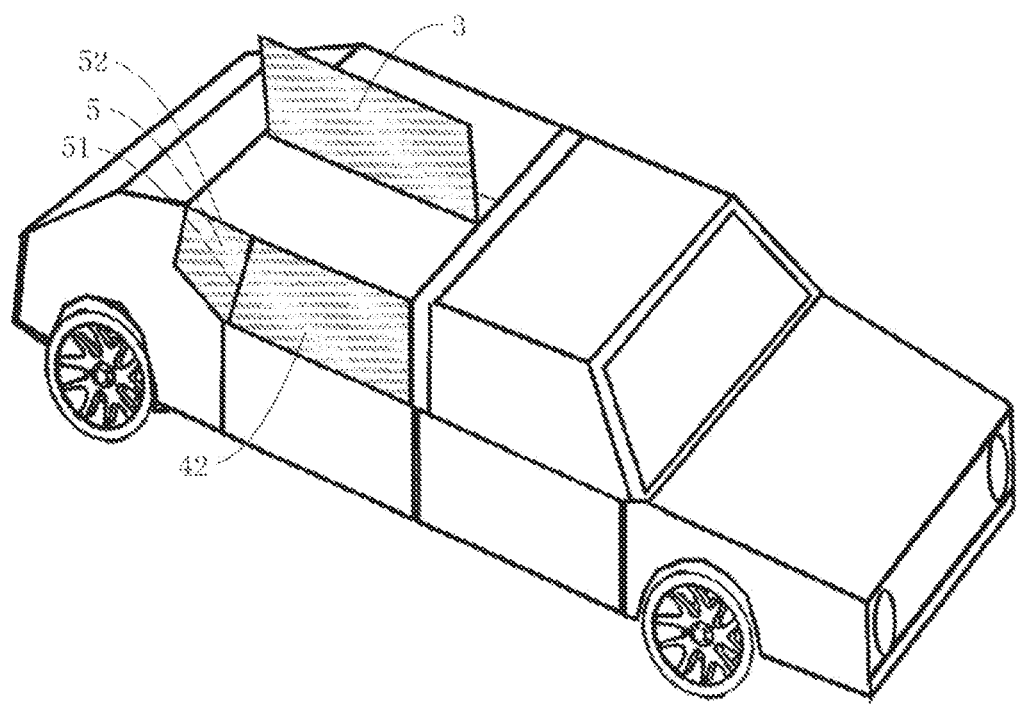
FIG. 16A is a structural schematic view of the vehicle door system in accordance with an embodiment of the present invention.
Figure 16B:
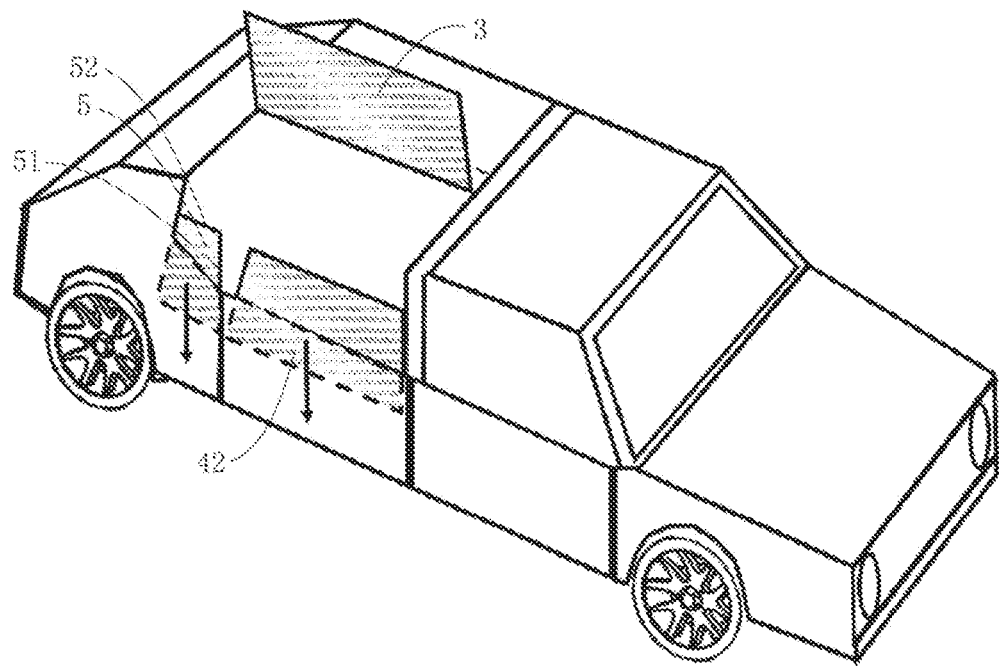
FIG. 16B is a structural schematic view of the vehicle door system in accordance with an embodiment of the present invention.

In some embodiments, as shown in FIG. 15, FIG. 16A, and FIG. 16B, the corner window 5 is movably provided at the fourth opening so as to open and close the fourth opening.

In one example, as shown in FIG. 15, in order to provide a larger open space for the passenger or the driver to get on and off to facilitate get-on and get-off, and avoid collision, preferably, the top door 3 is hinged to an edge of the top doorway 11, the top door 3 has a fifth rim 31 hinged to the edge of the top doorway 11, and the corner window portion 2 is interconnected with the doorway 1. The corner window 5 is mounted on the top door 3 and moves with the top door 3 so as to open and close the corner window portion 2. For example, the top door 3 has a first rim 32 adjacent to the top edge of the side window 42, and a second rim 33 extending along the direction of the first rim 32 towards the vehicle body tail portion 100c, the corner window 5 is mounted on the second rim 33, and the corner window 5 can move with the top door 3 so as to open and close the fourth opening (the corner window portion 2) on the side of the vehicle body 100. In this way, when the passenger or the driver gets on or off, the corner window 5 moves together with the top door 3, so that the top doorway 11 and the corner window portion 2 are opened together, and as the corner window portion 2 and the top doorway 11 are interconnected, when the passenger or the driver gets on or off, the corner window portion 2 may form an avoiding space, thereby avoiding collision with the passenger or the driver.

Optionally, the top door 3 is in an arc-shaped plate structure, so that the top door 3 is adapted to the arc-shaped vehicle body top portion 100b, the appearance of the vehicle is more beautiful and softer, avoiding the feeling of abruptness. The corner window 5 may be correspondingly provided as a flat plate structure or an arc-shaped plate structure in accordance with the shape of a side wall of the side skirt 100a, so as to ensure aesthetics of the side skirt 100a.

In another example, as shown in FIG. 16A and FIG. 16B, the corner window 5 is configured to be capable of raising and lowering within the side skirt 100a of the vehicle body, so as to open and close the corner window portion 2.

In an embodiment, the vehicle door system in an embodiment of the present invention further includes a first top door lock assembly 6 connected to the corner window 5. In order to connect the top door 3 connected with the corner window 5 to the side skirt 100a of the vehicle body more safely and more firmly, and facilitate the passenger or the driver in manually opening the top door 3 in an emergency situation, preferably, the first top door lock assembly 6 includes a first component 61 and a second component 62. The first component 61 and the second component 62 are mounted on the corner window 5 and an edge of the corner window portion 2, respectively, so that the first component 61 and the second component 62 can be locked with each other. At this time, the first component 61 and the top door 3 are indirectly connected by the corner window 5. As the corner window portion 2 is formed at the side skirt 100a, mounting the second component 62 on the corner window portion 2 enables the second component to be closer to the side of the passenger or the driver, which is more convenient for the passenger or the driver to manually open the top door 3 in an emergency situation. Preferably, the first top door lock assembly 6 may be located in the middle of the vehicle body 100 in the height direction, so that the first top door lock assembly 6 is closer to the position of the passenger or the driver arm, further facilitating operations.

As the corner window portion 2 is interconnected with the doorway 1, when the side door 4 closes the side doorway 12 and the corner window 5 closes the corner window portion 2, the corner window 5 contacts the side door 4, then in order that the corner window 5 can be well sealed with the side door 4 when the corner window portion 2 is closed, for example, preventing wind or rain and snow from entering the vehicle body 100 from a gap between the corner window 5 and the side door 4, a sealing member may be used for sealing.

In an embodiment, the corner window 5 has a corner window side rim 51 and a corner window top rim 52, wherein the corner window side rim 51 forms a portion of the edge of the third opening 12ab, the corner window side rim 51 cooperates with the side rim of the side window 42, the top door 3 has the first rim 32 adjacent the top edge of the side window 42, and the second rim 33 extending along the direction of the first rim 32 towards the vehicle body tail portion 100c, and the corner window top rim 52 cooperates with the second rim 33. Wherein, the corner window top rim 52 and/or the second rim 33 is provided with a sealing member. That is to say, the sealing member may be separately provided at the corner window top rim 52, or the sealing member may be separately provided at the second rim 33, or the sealing member may be simultaneously provided at the corner window top rim 52 and the second rim 33.

In order to further avoid wind and rain and snow from entering the vehicle body 100 through the gaps between the doorway 1 and the top door 3, and between the side door 4 and the corner window 5, preferably, a sealing strip is provided on the edge of the doorway 1, and the sealing strip extends in an extending direction of the edge of the doorway 1.

In an embodiment, the top door 3 has a third rim 34, and the third rim 34 cooperates with a front edge of the first opening. The vehicle door system further includes a second top door lock assembly 7, wherein the second top door lock assembly 7 includes a third component 71 and a fourth component 72, wherein the third component 71 is mounted at the third rim 34, and the fourth component 72 is mounted at the front edge of the first opening, so that the third component 71 and the fourth component 72 can be locked.

In another embodiment, the top door 3 has a fourth rim 35, the fourth rim 35 cooperates with a rear edge of the first opening, the vehicle door system further includes a third top door lock assembly 10, the third top door lock assembly 10 includes a fifth component 101 and a sixth component 102, the fifth component 101 is mounted at the fourth rim 35, and the sixth component 102 is mounted at the rear edge of the first opening, so that the fifth component and the sixth component can be locked or restrict relative movement between the top door 3 and the vehicle body top portion 10b.

By adding the second top door lock assembly and/or the third top door lock assembly, when closing the top doorway 11, the top door 3 can be locked more firmly with the vehicle body 100, moreover, the second top door lock assembly and the third top door lock assembly are located at two ends of the top door 3 away from each other, respectively, which further improves the firmness of the locking of the top door 3.

In an embodiment, the top door 3 has the fifth rim 31 connected to the vehicle body top portion 100b, and the top door 3 opens and closes the first opening of the vehicle body top portion 100b with the fifth rim 31 as a rotating shaft. The side door body 41 has a sixth rim 411 connected to the side skirt 100a of the vehicle body 100, and the side door body 41 opens and closes the second opening 12aa of the side skirt 100a of the vehicle body 100 with the sixth rim 411 as a rotating shaft.

Figure 17:
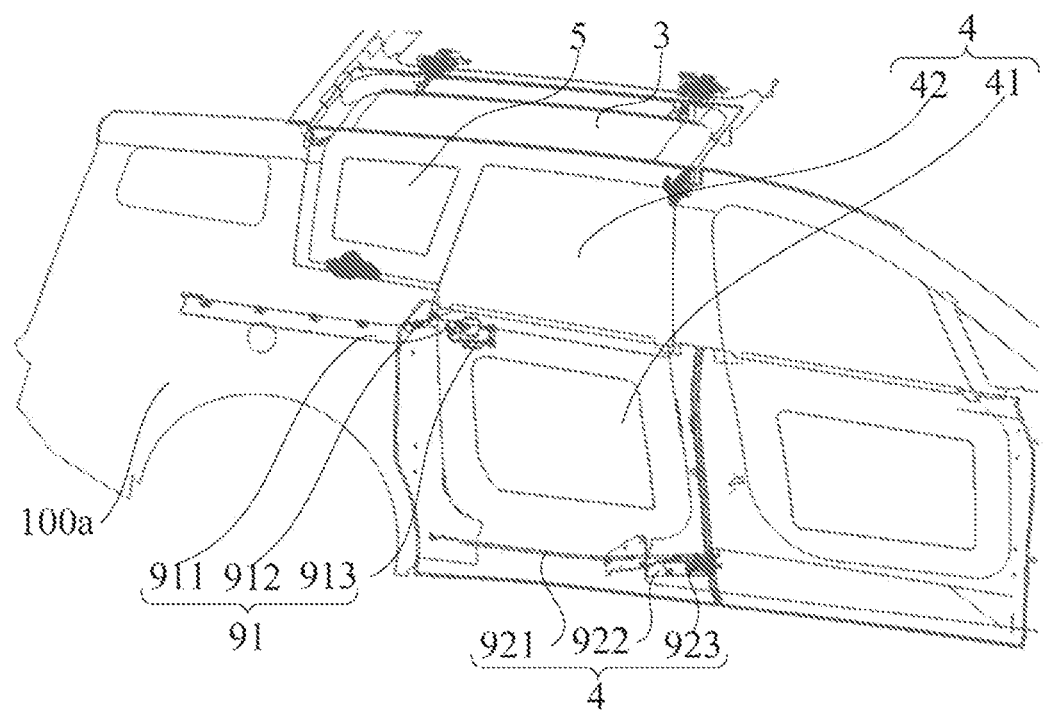
FIG. 17 is a structural schematic view of the vehicle door system in accordance with an embodiment of the present invention.
Figure 18:
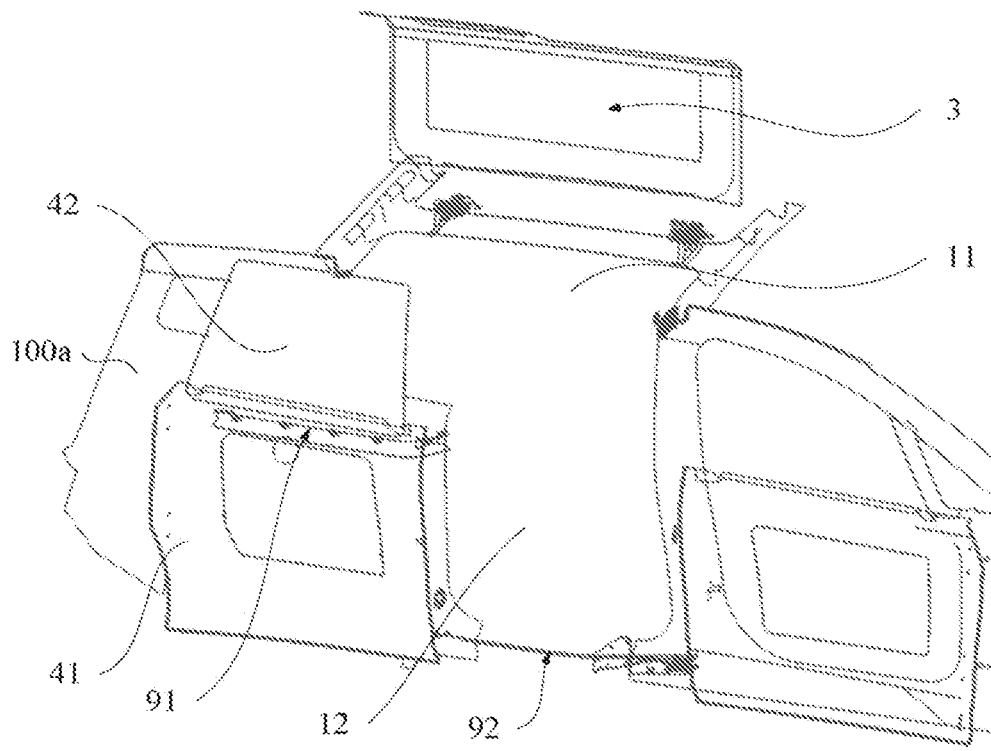
FIG. 18 is a structural schematic view of the vehicle door system in accordance with an embodiment of the present invention.

In an embodiment, as shown in FIG. 17 and FIG. 18, the vehicle door system 100 further includes a first sliding mechanism 91 and a second sliding mechanism 92, wherein the first sliding mechanism 91 and the second sliding mechanism 92 are both provided between the side skirt 100a and the side door body 41, and the first sliding mechanism 91 and the second sliding mechanism 92 are configured to, in synchronization, drive the side door body 41 to move relative to the side skirt 100a.

In an embodiment, the first sliding mechanism and the second sliding mechanism are arranged in a staggered manner in a direction from the vehicle body top portion to the vehicle body bottom portion, and the first sliding mechanism and the second sliding mechanism are arranged in a staggered manner in a direction from the vehicle body head portion to the vehicle body tail portion.

Figure 2:
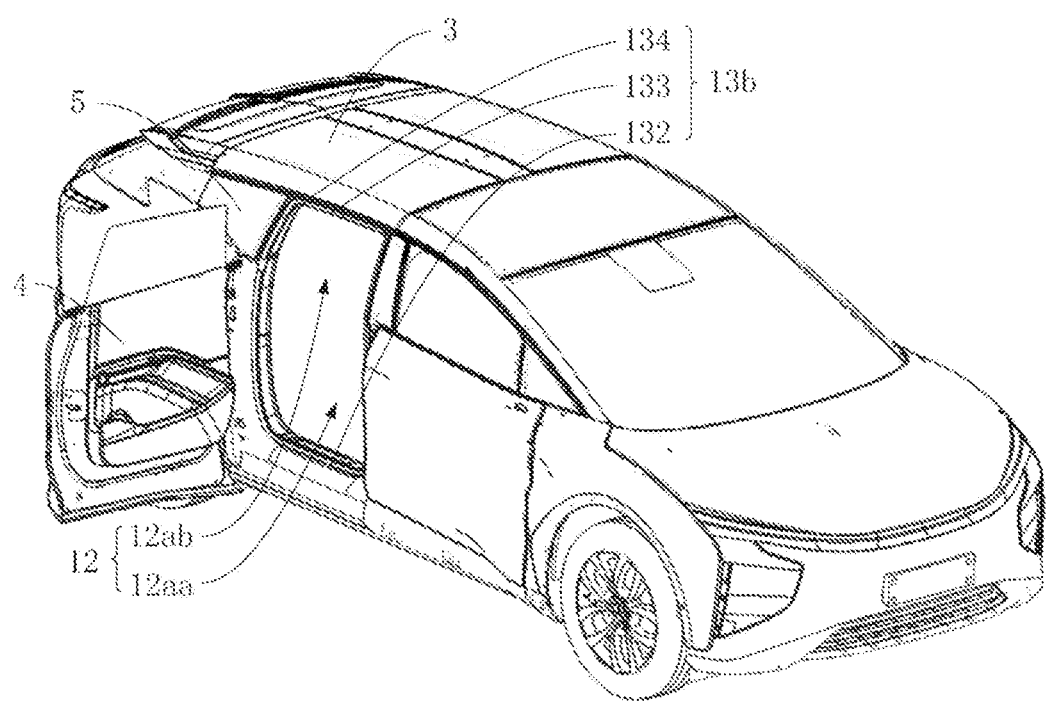
FIG. 2 is a structural schematic view of the vehicle door system in accordance with an embodiment of the present invention.
Figure 3:
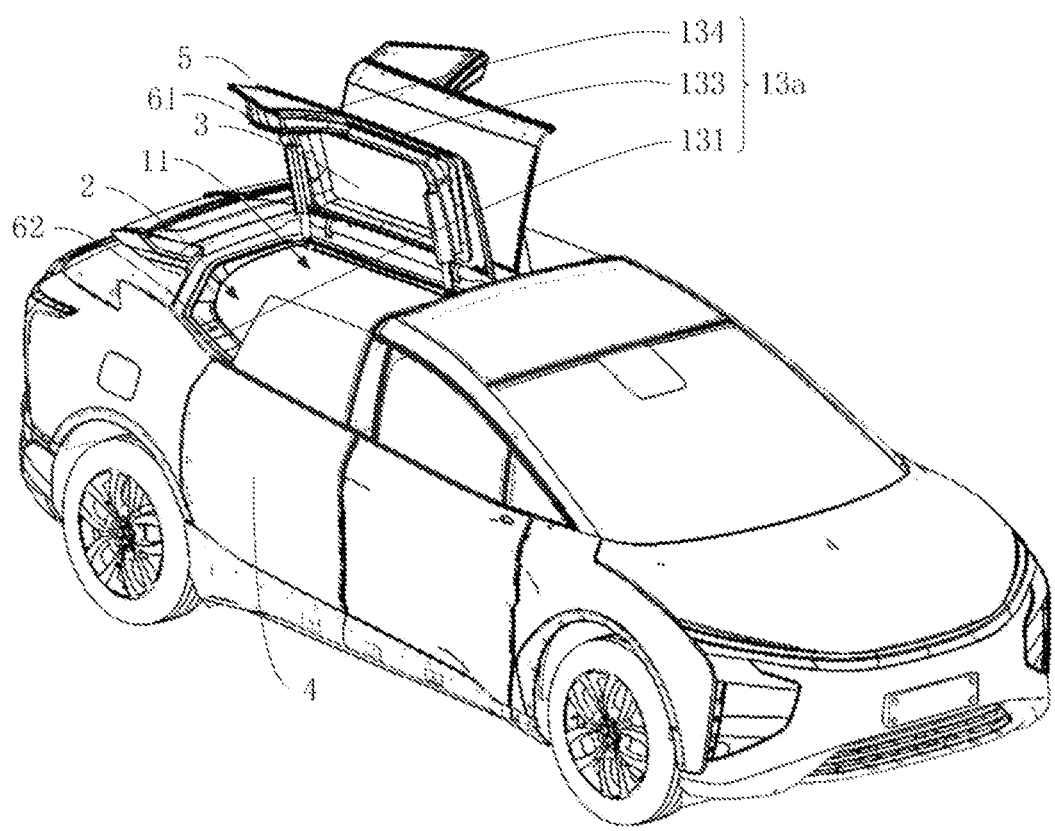
FIG. 3 is a structural schematic view of the vehicle door system in accordance with an embodiment of the present invention.

In an example, as shown in FIG. 1 and FIG. 2, the first sliding mechanism 91 and the second sliding mechanism 92 are both located below the top door 3, and the first sliding mechanism 91 and the second sliding mechanism 92 are provided at an interval in a front-back direction of the vehicle body 100, and meanwhile, they are provided at an interval in a vertical direction of the vehicle body. Thus, it not only can ensure smooth opening or closing of the side door body 41, but also avoids interference of the side door body 41 with other components on the vehicle body 100, especially avoiding interference with the opening of the top door 3, moreover, compared with the case that three sliding mechanisms, namely, upper, middle, and lower sliding mechanisms, are usually provided for vehicles in the prior art, the vehicle door system in the embodiment of the present invention may save the amount of components, and reduce the costs.

Wherein, optionally, the first sliding mechanism 91 is located in an upper middle position of the side skirt 100a, and the second sliding mechanism 92 is located in a position close to a bottom portion of the side skirt 100a, and the second sliding mechanism 92 is close to the vehicle head relative to the first sliding mechanism 91. Undoubtedly, it is not limited thereto, while the positions of the first sliding mechanism 91 and the second sliding mechanism 92 also may be designed according to practical requirements.

In an embodiment, the first sliding mechanism 91 includes a first guide rail 911, a first hinge mount 912, and a first trolley 913, wherein the first guide rail 911 is provided on the side skirt 100a, the first hinge mount 912 is provided on the side door body 41, the first trolley 913 is provided on the first hinge mount 912, and the first trolley 913 can slide along the first guide rail 911.

In an example, with continued reference to what is shown in FIG. 1 and FIG. 2, the first trolley 913 can drive the first hinge mount 912 connected thereto to slide along the first guide rail 911, and the first hinge mount 912 can drive the side door body 41 to slide along the first guide rail 911 towards the vehicle body tail portion 100c or the vehicle body head portion, thus the opening or closing of the side door 40 may be realized, with easy and convenient operation. Wherein, the first hinge mount 912 is connected to the first trolley 913 through a pin shaft. All of the first guide rail 911, the first hinge mount 912, and the first trolley 913 may adopt various technical solutions known by those ordinarily skilled in the art now and in the future, and will not be described in detail herein.

In an embodiment, the second sliding mechanism 92 includes a second guide rail 921, a second hinge mount 922, and a second trolley 923, wherein the second guide rail 921 is provided on the side skirt 100a, the second hinge mount 922 is provided on the side door body 41, the second trolley 923 is provided on the second hinge mount 922, and the second trolley 923 can slide along the second guide rail 921.

In an example, continuing with FIG. 1 and FIG. 2, the second trolley 923 can drive the second hinge mount 922 connected thereto to slide along the second guide rail 921, and the second hinge mount 922 can drive the side door body 41 to slide along the second guide rail 921 towards the vehicle body tail portion 100c or the vehicle body head portion. Thus, the opening or closing of the side door 40 may be realized, moreover, the sliding of the side door body 41 relative to the side skirt 100a is more stable. Wherein, the second hinge mount 922 is connected to the second trolley 923 through a pin shaft. Wherein, all of the second guide rail 921, the second hinge mount 922, and the second trolley 923 may adopt various technical solutions known by those ordinarily skilled in the art now and in the future, and will not be described in detail herein.

In order to realize automatic control of the movement of the top door 3, preferably, the vehicle door system in an embodiment of the present invention further includes a support driving assembly 8, wherein the support driving assembly 8 is connected to the top door 3 at one end, and connected to the vehicle body top portion 100b or the side skirt 100a at the other end, so as to drive the top door 3 to open and close the top doorway 11. Specifically, the support driving assembly 8 are provided opposite relative to the top door 3 and the fifth rim 31, and the support driving assembly 8 may be an electric push rod or a hydraulic push rod, wherein the support driving assembly 8 is hinged to the top door 3 at one end, and hinged to the vehicle body top portion 100b or the side skirt 100a at the other end. In other examples, the support driving assembly 8 may also be axle motors arranged at the fifth rim 31, and the axle motors is connected to a hinge assembly 9 at one end, and connected to the vehicle body top portion 100b at the other end.

Preferably, the vehicle door system further includes the hinge assembly 9, and the fifth rim 31 of the top door 3 is hinged to the vehicle body top portion 100b by the hinge assembly 9.

In one example, the top door 3 has the third rim 34 and the fourth rim 35, wherein the third rim 34 cooperates with the front edge of the first opening, and the fourth rim 35 cooperates with the rear edge of the first opening. The hinge assembly 9 may be a four-bar assembly. There are two four-bar assemblies and they are located at the third rim 34 and the fourth rim 35 of the top door 3, respectively, and the top door 3 is hinged to the vehicle body top portion 100b by two four-bar assemblies. In other examples, the hinge assembly 9 may also adopt various structures known to those ordinarily skilled in the art now and in the future, for example, hinges in slide-in or snap-in and other structures may be adopted, which will not be described in detail herein.

In an embodiment, the vehicle door system further includes an obstacle detector and a vehicle door controller. The obstacle detector may be provided on any one of the top door 3, the side door 4, and the vehicle body 100, and configured to detect whether there is an obstacle in the opening and closing stroke of the top door 3 and/or the side door 4. The vehicle door controller is provided on any one of the top door 3, the side door 4, and the vehicle body 100, and is configured to control the movement of at least one of the side door body 41, the side window 42, and the top door 3. By providing the vehicle door controller, automatic opening and closing of the top door 3 and the side door body 41 may be realized; moreover, by providing the obstacle detector, it is possible to monitor whether there is an obstacle in the opening and closing process of the top door 3 and the side door body 41, so as to avoid occurrence of accidents, thereby improving safety performance.

In one example, the vehicle door controller is configured to detect whether a door opening request is received; detect, in case that the door opening request is received, whether a distance between the top edge of the side window and the top edge of the side door body reaches a predetermined distance; and send, in case that the predetermined distance is reached, an opening signal, so as to control the top door and/or the side door body to be opened. Besides, the vehicle door controller further may execute a control method as follows.

A control method of a vehicle door system in accordance with an embodiment in a second aspect of the present invention is described below with reference to FIG. 19-FIG. 25.

Figure 19:
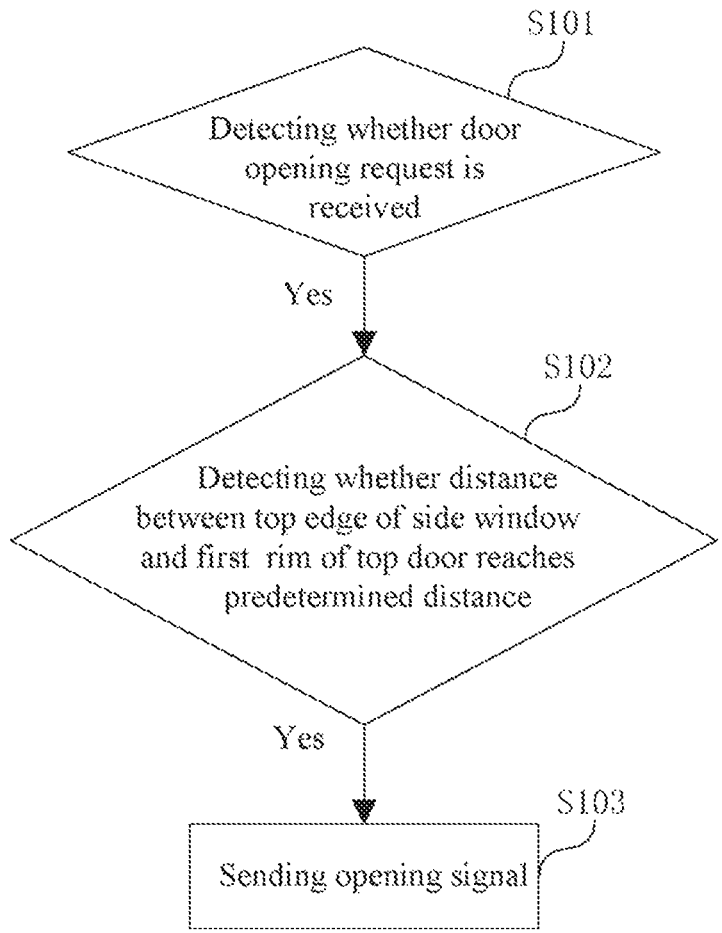
FIG. 19 is a flow chart of a control method of the vehicle door system in accordance with an embodiment of the present invention.

As shown in FIG. 19, the control method of a vehicle door system in accordance with an embodiment of the present invention includes:

step S101: detecting whether a door opening request is received, wherein the door opening request is configured to request the top door 3 and/or the side door body 41 to be opened; and entering step S102 in case that the door opening request is received;

step S102: detecting whether the distance between the top edge of the side window 42 and the first rim 32 of the top door 3 reaches the predetermined distance; and entering step S103 in case that the predetermined distance is reached; and step S103: sending an opening signal, wherein the opening signal is configured to control the top door 3 and/or the side door body 41 to be opened.

It should be noted that the side window 42 is mounted above the side door body 41, and the side window 42 may raise and lower relative to the side door body 41. In a situation that the top door 3 and the side door 4 are simultaneously closed, the top edge of the side window 42 cooperates with the first rim 32 of the top door 3, at this time, the distance between the top edge of the side window 42 and the first rim 32 of the top door 3 is minimal, and at this time, the top door 3 or the side door body 41 cannot be directly opened. When the side window 42 is lowered to such a degree that the distance from the top edge of the side window 42 to the first rim 32 of the top door 3 is a first predetermined distance, that is, when the top edge of the side window 42 reaches a position A, the top edge of the side window 42 and the first rim 32 of the top door 3 are disengaged from each other, at this time, the side door body 41 may be directly opened.

In one example, the controller may receive the opening signal, and send the signal to drive the support driving assembly to act so as to open the top door 3.

According to the control method in an embodiment of the present invention, by detecting whether the distance between the top edge of the side window 42 and the first rim 32 of the top door 3 reaches the predetermined distance, it may be judged whether the top edge of the side window 42 and the first rim 32 of the top door 3 are disengaged, and when the top edge of the side window 42 is located at the position A, that is, the predetermined distance is reached, the side door body 41 may be opened, thereby facilitating the driver or the passenger to get on and off.

Figure 20:
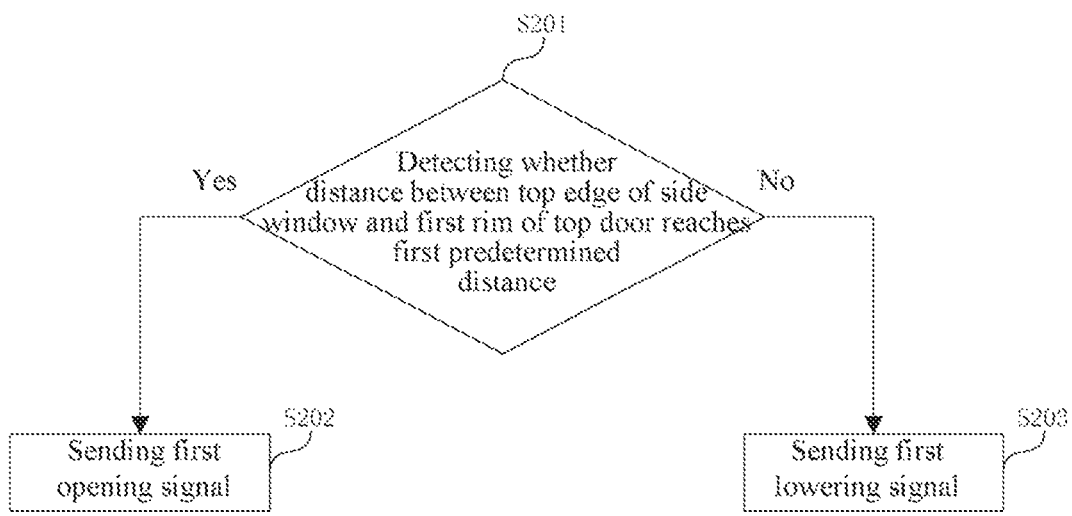
FIG. 20 is a flow chart of the control method of the vehicle door system in accordance with an embodiment of the present invention.

In an embodiment, as shown in FIG. 20, the door opening request includes a first door opening request, and step S102 (detecting whether the distance between the top edge of the side window 42 and the first rim 32 of the top door 3 reaches the predetermined distance) includes:

entering step S201, in case that the first door opening request is received;

step S201: detecting whether the distance between the top edge of the side window 42 and the first rim 32 of the top door 3 reaches the first predetermined distance, wherein the first door opening request is configured to request the side door body 41 to be opened:

step S103 (sending an opening signal) includes:

entering step S202, in case that the first predetermined distance is reached; and step S202: sending a first opening signal, wherein the first opening signal is configured to control the side door body 41 to be opened.

In an embodiment, with continued reference to what is shown in FIG. 18, step S103 (sending an opening signal) further includes;

entering step S203, in case that the first predetermined distance is not reached; and step S203: sending a first lowering signal, wherein the first lowering signal is configured to control the side window 42 to be lowered, so that the distance between the top edge of the side window 42 and the first rim 32 of the top door 3 reaches the first predetermined distance.

In one example, the side door 4 is provided with a pushing mechanism for controlling the side window 42 to raise and lower, and in response to the first lowering signal, the pushing mechanism starts and drives the side window 42 to be lowered. When the side window 42 is lowered to such a position that the distance between the top edge of the side window 42 and the first rim 32 of the top door 3 reaches the first predetermined distance, the pushing mechanism stops so that the side window 42 remains in a current position.

Figure 21:
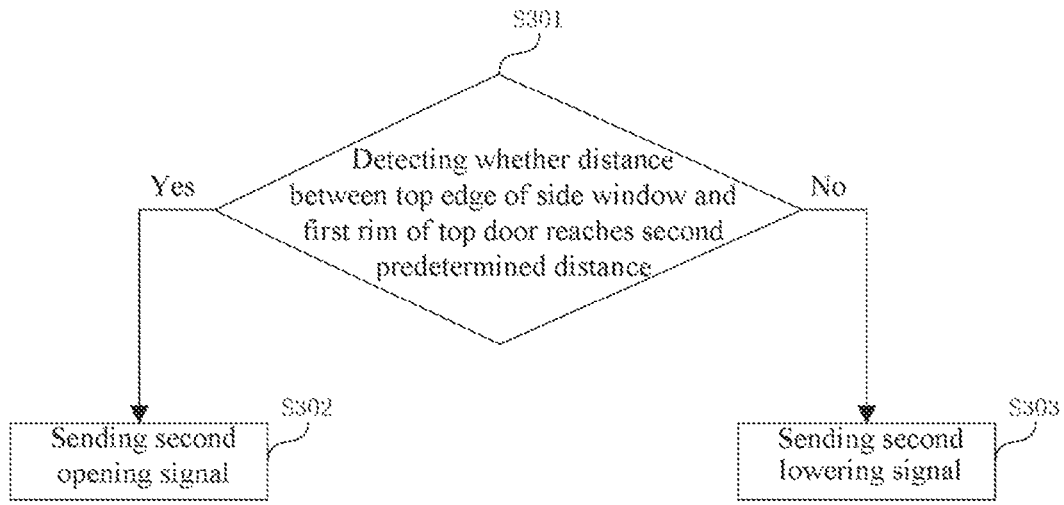
FIG. 21 is a flow chart of the control method of the vehicle door system in accordance with an embodiment of the present invention.

In an embodiment, as shown in FIG. 21, the door opening request includes a second door opening request, and step S102 (detecting whether the distance between the top edge of the side window 42 and the first rim 32 of the top door 3 reaches the predetermined distance) includes:

entering step S301, in case that the second door opening request is received; and step S301: detecting whether the distance between the top edge of the side window 42 and the first rim 32 of the top door 3 reaches a second predetermined distance, wherein the second door opening request is configured to request the top door 3 to be opened, and the second predetermined distance is greater than the first predetermined distance;

step S103 (sending an opening signal) includes:

entering step S302, in case that the second predetermined distance is reached; and step S302: sending a second opening signal, wherein the second opening signal is configured to control the top door 3 to be opened.

It may be understood that, when the distance between the top edge of the side window 42 and the first rim 32 of the top door 3 reaches the second predetermined distance, cooperation between the side door 4 and the top door 3 is canceled, at this time, the top door 3 may be controlled to be opened separately, and the side door body 41 will not interfere with the opening of the top door 3.

In an embodiment, the method proceeds to step S303, in case that the second predetermined distance is not reached;

step S303: sending a second lowering signal, wherein the first lowering signal is configured to control the side window 42 to be lowered, so that the distance between the top edge of the side window 42 and the first rim 32 of the top door 3 reaches the second predetermined distance.

Figure 22:
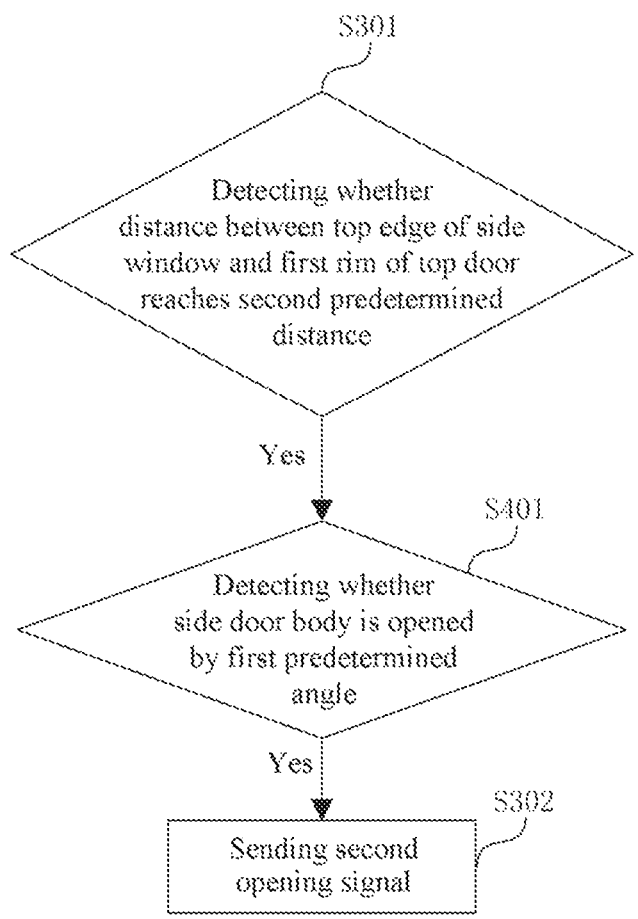
FIG. 22 is a flow chart of the control method of the vehicle door system in accordance with an embodiment of the present invention.

In an embodiment, as shown in FIG. 22, step S302 (sending the second opening signal) further includes:

step S401: detecting, in case that the second predetermined distance is not reached, whether the side door body 41 is opened by a first predetermined angle; and entering step S302 in case that the side door body is opened by the first predetermined angle; and step S302: sending the second opening signal.

In one example, in case that it is detected that the side door body 41 has opened by the first predetermined angle, it is indicated that the top door 3 and the side door 4 have been disengaged, at this time, the second opening signal may be sent so as to control the top door 3 to be directly opened; in case that it is detected that the side door body 41 is not opened by the first predetermined angle, in order to avoid the side window 42 from interfering with the opening of the top door 3, it is necessary to send the second lowering signal to control the side window 42 to be lowered, so that the distance between the top edge of the side window 42 and the first rim 32 of the top door 3 reaches the second predetermined distance.

Figure 23:
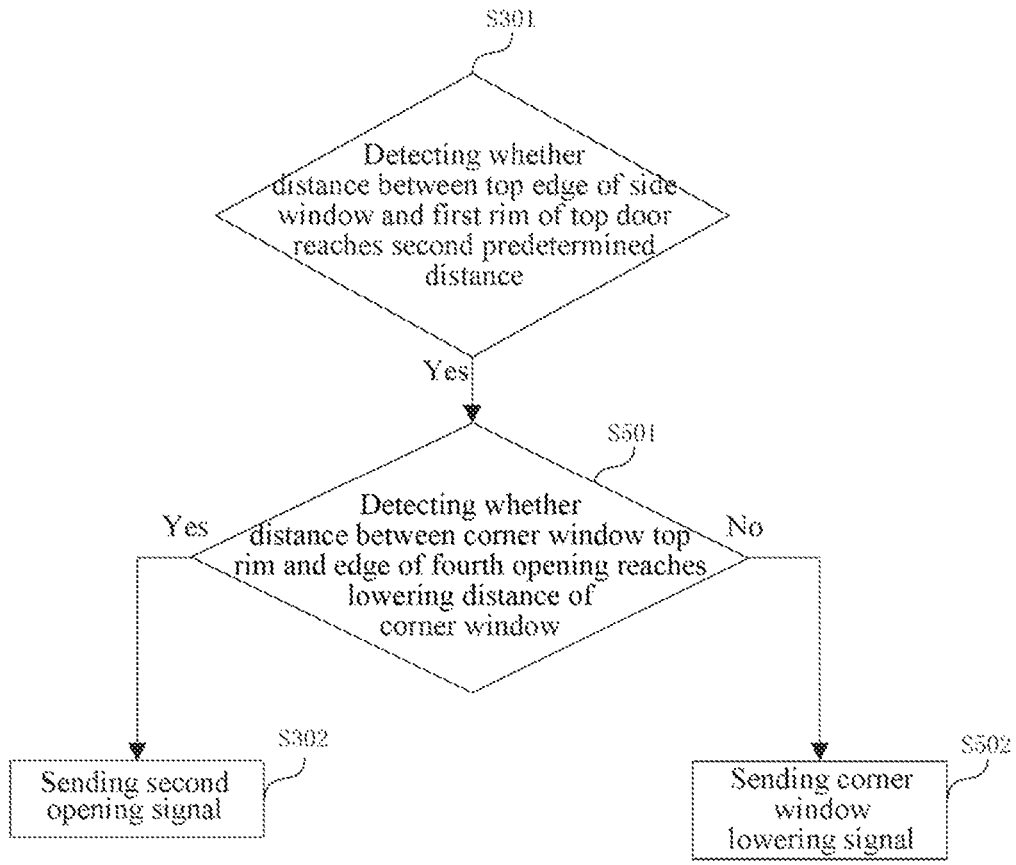
FIG. 23 is a flow chart of the control method of the vehicle door system in accordance with an embodiment of the present invention.

In an embodiment, as shown in FIG. 23, step S302 (sending the second opening signal) further includes:

entering step S501, in case that the second predetermined distance is reached;

step S501: detecting whether a distance between the corner window top rim 52 and the edge of the fourth opening reaches a lowering distance of the corner window; and entering step S302 in case that the lowering distance of the corner window is reached; and step S302: sending the second opening signal.

In one example, in case that the distance between the corner window top rim 52 and the edge of the fourth opening does not reach the lowering distance of the corner window, the top door 3 will interfere with the corner window 5 in the opening process, and therefore the top door 3 cannot be opened under this condition.

In an embodiment, with continued reference to what is shown in FIG. 23, step S302 (sending the second opening signal) further includes:

entering step S502, in case that the lowering distance of the corner window is not reached; and step S502: sending a corner window lowering signal, wherein the corner window lowering signal is configured to control the corner window 5 to be lowered, so that the distance between the corner window top rim 52 and the edge of the fourth opening reaches the lowering distance of the corner window.

In one example, in case that the corner window 5 is lowered to a position where the distance between the corner window top rim 52 and the edge of the fourth opening reaches the lowering distance of the corner window, the method proceeds to step S302, that is, sending the second opening signal so as to control the top door 3 to be opened.

Figure 24:
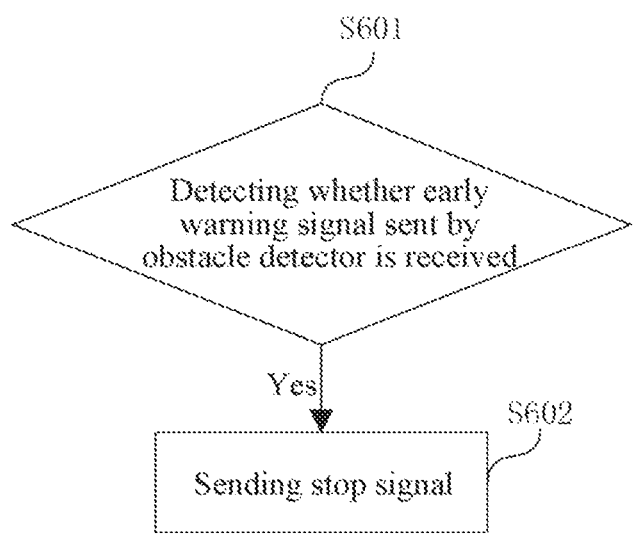
FIG. 24 is a flow chart of the control method of the vehicle door system in accordance with an embodiment of the present invention.

In an embodiment, as shown in FIG. 24, the control method further includes:

step S601: detecting whether an early warning signal sent by the obstacle detector is received, wherein the early warning signal is configured to prompt that there is an obstacle in the opening stroke of the top door 3 and/or the side door body 41; and step S602: sending a stop signal in case that the early warning signal is received, wherein the stop signal is configured to control the top door 3 and/or the side door body 41 to stop opening.

In this way, when the obstacle detector detects that there is an obstacle in the vicinity of the top door 3 or the side door body 41, it may be realized that the top door 3 or the side door body 41 is controlled to stop opening, thereby avoiding the top door 3 or the side door body 41 from touching the obstacle in the opening stroke, so as to improve the safety of the vehicle door system.

Figure 25:
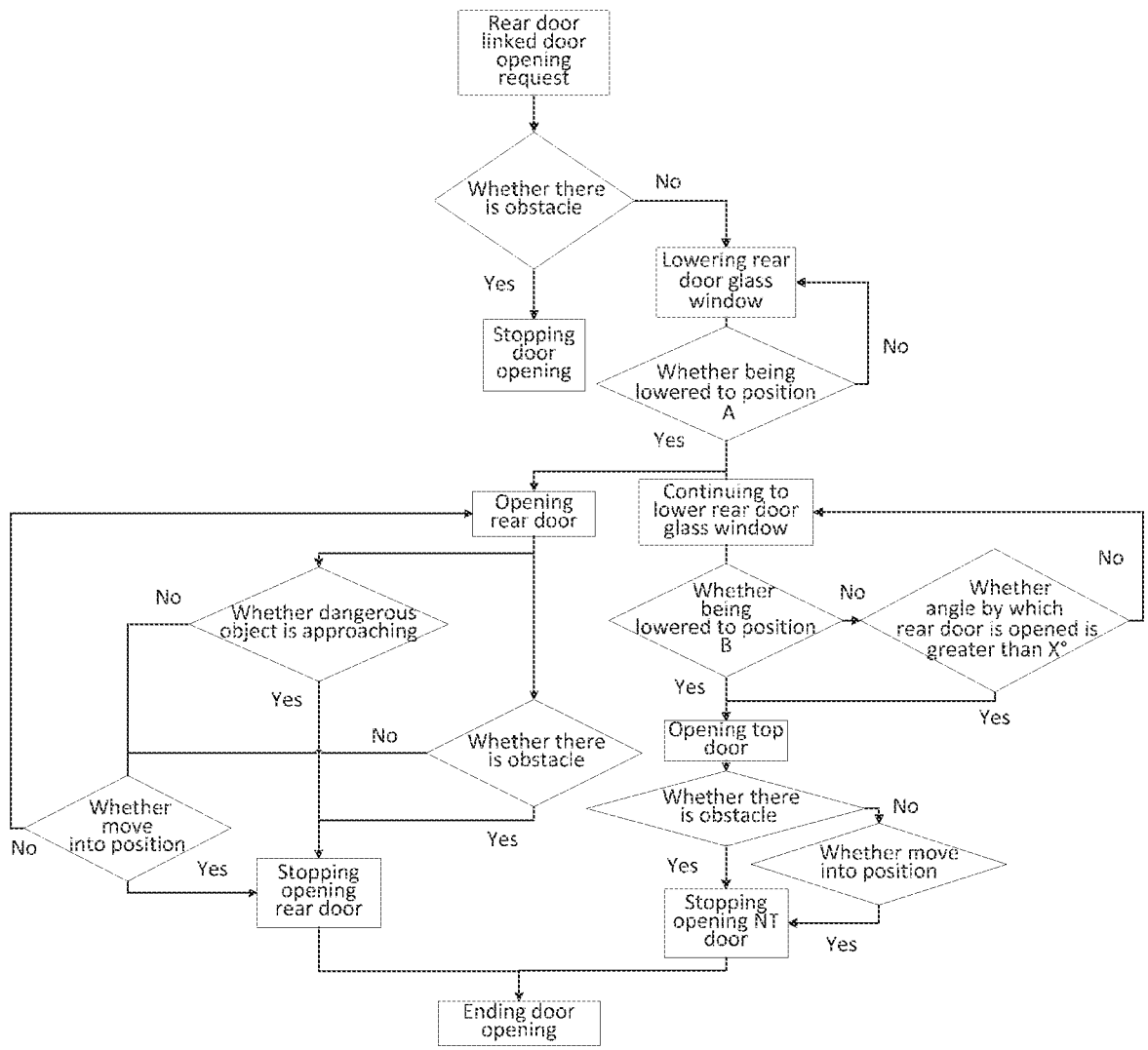
FIG. 25 is a flow chart of the control method of the vehicle door system in accordance with an embodiment of the present invention.

FIG. 25 shows a specific example of the control method.

As shown in FIG. 25, under a condition that a rear door linked door opening request (i.e., door opening request) is received, it is detected by the obstacle detector whether there is an obstacle in the vicinity of the rear door (i.e., side door body 41), and in case that there is an obstacle, the stop signal is sent to control the rear door to stop opening.

If no obstacle is detected, the side window (i.e., side window 42) of the rear door is controlled to be lowered, and it is detected whether the top edge of the side window is lowered to the position A, wherein in case that the top edge of the side window is lowered to the position A, the distance between the top edge of the side window and the first rim 32 of the top door 3 is the first predetermined distance. The first opening signal is then sent to control the rear door to be opened, and it is detected by the obstacle detector whether there is an obstacle in the vicinity of the rear door or whether there is a dangerous object approaching the rear door in the opening process of the rear door. In case that the stop signal sent by the obstacle detector is not received, it is detected whether the rear door moves into position; and in case that the stop signal sent by the obstacle detector is received, the rear door is controlled to stop opening.

It is detected whether an angle by which the rear door is opened is greater than X (i.e., the first predetermined angle). In case that it is greater than X, the top door 3 is controlled to be opened. In case that it is not greater than X, the side window of the rear door is controlled to continue to be lowered from the position A. It is detected whether the top rim of the side window is lowered to a position B, wherein the height of the position B is lower than the height of the position A. In case that the top rim of the side window is lowered to the position B, the distance between the top edge of the side window and the first rim 32 of the top door 3 is the second predetermined distance, and the second opening signal is sent to control the top door 3 to be opened.

In the process of opening the top door 3, it is necessary to judge whether there is an obstacle in the vicinity of the top door 3. In case that there is an obstacle, the stop signal is sent to control the top door 3 to stop opening. In case that there is no obstacle, it is judged whether the top door 3 moves into position, and in case that the top door 3 moves into position, the stop signal is sent to control the top door 3 to stop opening.

The control method in accordance with an embodiment in a third aspect of the present invention is described below with reference to FIG. 26-FIG. 29.

Figure 26:
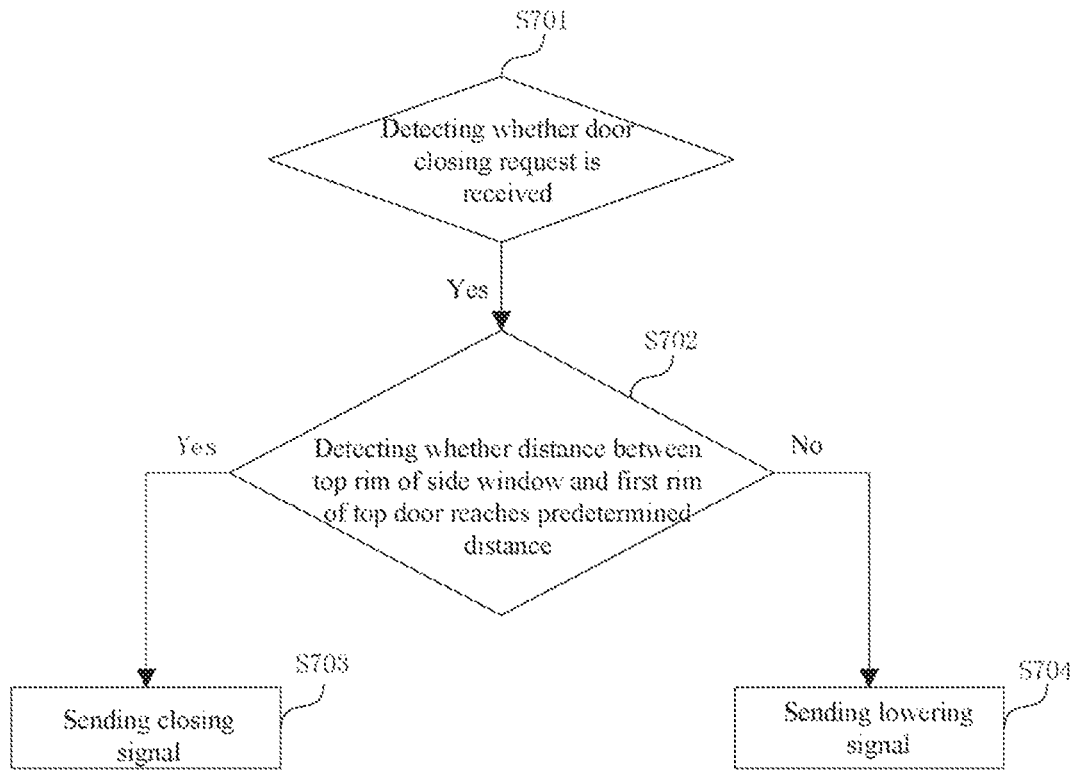
FIG. 26 is a flow chart of the control method of the vehicle door system in accordance with an embodiment of the present invention.

As shown in FIG. 26, the control method of a vehicle door system in an embodiment of the present invention includes:

step S701: detecting whether a door closing request is received, wherein the door closing request is configured to request the top door 3 and/or the side door body 41 to be closed; and entering step S702 in case that the door closing request is received:

step S702: detecting, in case that the door closing request is received, whether the distance between a top rim of the side window 42 and the first rim of the top door 3 reaches the predetermined distance; and entering step S703 in case that the predetermined distance is reached; and step S703: sending a closing signal, wherein the closing signal is configured to control the top door 3 and/or the side door body 41 to be closed.

It should be noted that, in case that the distance between the top rim of the side window 42 and the first rim 32 of the top door 3 is greater than or equal to the predetermined distance, the relative movement between the side window 42 and the top door 3 will not interfere, thus it may be ensured that the top door 3 and/or the side door body 41 may be smoothly closed.

In an embodiment, with continued reference to FIG. 26, the control method further includes;

entering step S704, in case that the predetermined distance is not reached;

step S704: sending a lowering signal, wherein the lowering signal is configured to control the side window 42 to be lowered, so that the distance between the top edge of the side window 42 and the first rim 32 of the top door 3 reaches the predetermined distance.

Figure 27:
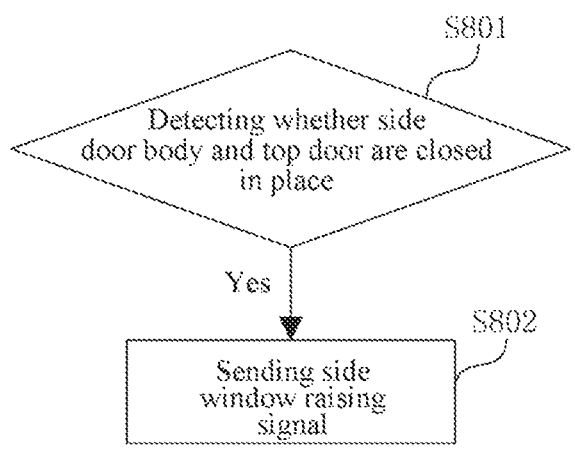
FIG. 27 is a flow chart of the control method of the vehicle door system in accordance with an embodiment of the present invention.

In an embodiment, as shown in FIG. 27, the control method further includes:

step S801: detecting whether the side door body 41 and the top door 3 are closed in place; and entering step S802 if so; and step S802: sending a side window raising signal, wherein the side window raising signal is configured to control the side window 42 to raise.

Figure 28:
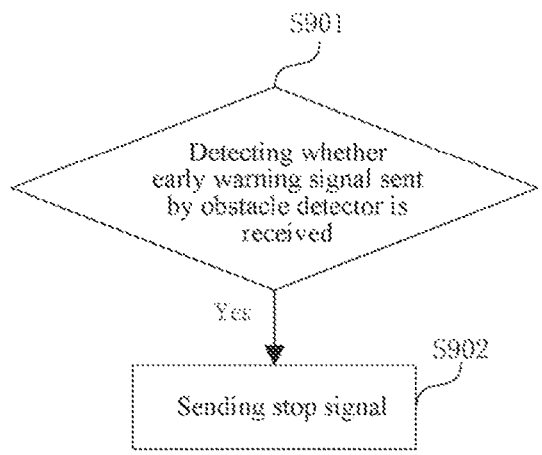
FIG. 28 is a flow chart of the control method of the vehicle door system in accordance with an embodiment of the present invention.

In an embodiment, as shown in FIG. 28, the control method further includes:

step S901: detecting whether the early warning signal sent by the obstacle detector is received, wherein the early warning signal is configured to prompt that there is an obstacle in the closing stroke of the top door 3 and/or the side door body 41; and entering step S902 in case that the early warning signal is received; and step S902: sending a stop signal, wherein the stop signal is configured to control the top door 3 and/or the side door body 41 to stop closing.

In this way, when the obstacle detector detects that there is an obstacle in the vicinity of the top door 3 or the side door body 41, it may be realized that the top door 3 or the side door body 41 is controlled to stop closing, thereby avoiding the top door 3 or the side door body 41 from touching the obstacle during the closing stroke, so as to improve the safety of the vehicle door system.

Figure 29:
FIG. 29 is a flow chart of the control method of the vehicle door system in accordance with an embodiment of the present invention.

A specific example of the control method is described below with reference to FIG. 29.

It is detected whether a rear door linked door closing request is received, and if so, it is detected whether the distance between the top rim of the side window 42 and the first rim 32 of the top door 3 is greater than B (i.e., second predetermined distance). In case that the distance is not greater than the predetermined distance B, the lowering signal is sent, wherein the lowering signal is configured to control the side window 42 to be lowered, so that the distance between the top rim of the side window 42 and the first rim 32 of the top door 3 is greater than B. In case that the distance is greater than the predetermined distance B, a closing signal is sent, wherein the closing signal is configured to control the top door 3 and/or the side door body 41 to be closed.

In the process of closing the side door 4, it is detected whether there is an obstacle in the vicinity of the side door 4. In case that there is an obstacle, the stop signal is sent so as to control the side door 4 to stop closing. In case that there is no obstacle, it is detected whether the side door 4 moves into position.

In the process of closing the top door 3, it is detected whether there is an obstacle in the vicinity of the top door 3. In case that there is an obstacle, the stop signal is sent so as to control the top door 3 to stop closing. In case that there is no obstacle, it is detected whether the top door 3 moves into position.

If at least one of the side door 4 and the top door 3 does not move into position, the side window 42 is controlled to stay in a current position. In case that both the side door 4 and the top door 3 move into position, the raising signal is sent so as to raise the side window 42 until the side window 42 raises to a position to close the third opening 12*ab*. So far, the door closing is completed.

A vehicle in accordance with an embodiment in a fourth aspect of the present invention includes the vehicle door system in accordance with an embodiment in the first aspect of the present invention. Other configurations of the vehicle in the present embodiment, such as a vehicle frame, a chassis, and a rear suspension apparatus, may adopt various technical solutions known to those ordinarily skilled in the art now and in the future, and are not described in detail herein.

The above-mentioned are merely specific embodiments of the present invention, but the scope of protection of the present invention is not limited thereto, and various changes or substitutions thereof that might be easily envisaged by those skilled in the art within the technical scope disclosed in the present invention should fall within the scope of protection of the present invention. Therefore, the scope of protection of the present invention should be determined by the scope of protection of the claims. The above are merely for preferred embodiments of the present invention, and it should be indicated that the above preferred embodiments should not be considered as limitation to the present invention, while the scope of protection of the present invention should be determined by the scope defined in the claims. Those ordinarily skilled in the art still could make improvements and modifications, without departing from the spirit and scope of the present invention, and all of these improvements and modifications also should be considered as within the scope of protection of the present invention.

What is claimed is:

1. A vehicle door system, comprising:
    a top door, the top door opening and closing a first opening of a vehicle body top portion; and
    a side door, the side door comprising a side door body and a side window, wherein the side door body opens and closes a second opening of a vehicle body side skirt, the side window is mounted on the side door body, both a top edge and a side edge of the side window are configured to be frameless, and the side window is capable of raising or lowering relative to the side door body; when the side door body closes the second opening, the side window raises or lowers to open or close a third opening of the vehicle body side skirt, wherein the third opening is located above the second opening, and the first opening, the second opening, and the third opening are interconnected; and
    a corner window, provided at a fourth opening of the vehicle body side skirt, wherein the fourth opening is interconnected with the first opening.

2. The vehicle door system of claim 1, wherein the top door has a first rim cooperating with a top edge of the side window, and the first rim is mounted with a sealing member.

3. The vehicle door system of claim 1, wherein the vehicle body has a doorway, and the doorway comprises a top doorway and a side doorway, and wherein the first opening is formed in the top doorway, and the second opening and the third opening are formed in the side doorway.

4. The vehicle door system of claim 3, wherein the side doorway comprises a first side doorway and a second side doorway that are symmetrically provided; the side door comprises a first side door and a second side door that are symmetrically provided, wherein the first side door is configured to open and close the first side doorway, and the second side door is configured to open and close the second side doorway; and the top door is connected to a top edge of the first side doorway or a top edge of the second side doorway; or
    the top doorway comprises a first top doorway and a second top doorway that are symmetrically provided, the side doorway comprises a first side doorway and a second side doorway that are symmetrically provided, and the first top doorway and the second top doorway are arranged at an interval; the side door comprises a first side door and a second side door that are symmetrically provided, the first side door is configured to open and close the first side doorway, and the second side door is configured to open and close the second side doorway; and the top door comprises a first top door and a second top door, the first top door is configured to open or close the first top doorway separately, and the second top door is configured to open or close the second top doorway separately.

5. The vehicle door system of claim 4, further comprising a first front door and a second front door, wherein the first front door is located between a vehicle body head portion and the first side door, and the second front door is located between the vehicle body head portion and the second side door, and
    wherein opening directions of the first side door and the first front door are the same or opposite, and opening directions of the second side door and the second front door are the same or opposite.

6. The vehicle door system of claim 3, wherein the top doorway comprises at least one pair of first top doorway and second top doorway that are symmetrically provided, and at least one pair of third top doorway and fourth top doorway that are symmetrically provided, the side doorway comprises at least one pair of first side doorway and second side doorway that are symmetrically provided, and at least one pair of third side doorway and fourth side doorway that are symmetrically provided; and
    the top door comprises a first top door, a second top door, a third top door, and a fourth top door provided corresponding to the first top doorway, the second top doorway, the third top doorway, and the fourth top doorway, respectively.

7. The vehicle door system of claim 6, wherein the relationships between the doorways and the top door and/or the side door are as one of the following:
the first top doorway, the second top doorway, the third top doorway, and the fourth top doorway are interconnected, and the first top door, the second top door, the third top door, and the fourth top door are an integral member so as to simultaneously open or close the first top doorway, the second top doorway, the third top doorway, and the fourth top doorway;
the first top doorway, the second top doorway, the third top doorway, and the fourth top doorway are provided at intervals; and the first top door and the third top door are an integral member so as to simultaneously open or close the first top doorway and the third top doorway, and the second top door and the fourth top door are an integral member so as to simultaneously open or close the second top doorway and the fourth top doorway;
the first top doorway, the second top doorway, the third top doorway, and the fourth top doorway are provided at intervals; and the first top door, the second top door, the third top door, and the fourth top door are separate members to each other, wherein the first top door is configured to separately open or close the first top doorway, the second top door is configured to separately open or close the second top doorway, the third top door is configured to separately open or close the third top doorway, and the fourth top door is configured to separately open or close the fourth top doorway; or
the side door comprises a first side door, a second side door, a third side door, and a fourth side door that are provided corresponding to the first side doorway, the second side doorway, the third side doorway, and the fourth side doorway, respectively; and wherein opening directions of the first side door and the third side door are the same or opposite, and opening directions of the second side door and the fourth side door are the same or opposite.

8. The vehicle door system of claim 1, wherein the vehicle body side skirt has the fourth opening interconnected with the third opening.

9. The vehicle door system of claim 8, wherein the corner window is arranged in one way of following:
the corner window is fixed at the fourth opening; or
the corner window is movably provided at the fourth opening so as to open and close the fourth opening.

10. The vehicle door system of claim 9, wherein
the top door has a first rim adjacent to the top edge of the side window, and a second rim extending along a direction of the first rim towards a vehicle body tail portion, the corner window is mounted on the second rim, and the corner window is capable of moving along with the top door so as to open and close the fourth opening, wherein a sealing member is provided between a corner window side rim and a side edge of the side window.

11. The vehicle door system of claim 10, further comprising a first top door lock assembly, wherein the first top door lock assembly comprises a first component and a second component, the first component is mounted on the corner window, and the second component is mounted at an edge of the fourth opening, so that the first component and the second component are capable of being locked.

12. The vehicle door system of claim 2, wherein the top door is arranged in one way of the following:
the top door has a third rim, the third rim cooperates with a front edge of the first opening, the vehicle door system further comprises a second top door lock assembly, the second top door lock assembly comprises a third component and a fourth component, the third component is mounted at the third rim, and the fourth component is mounted at the front edge of the first opening, so that the third component and the fourth component are capable of being locked,
the top door has a fourth rim, the fourth rim cooperates with a rear edge of the first opening, the vehicle door system further comprises a third top door lock assembly, the third top door lock assembly comprises a fifth component and a sixth component, the fifth component is mounted at the fourth rim, and the sixth component is mounted at the rear edge of the first opening, so that the fifth component and the sixth component are capable of being locked or restricting relative movement between the top door and the vehicle body top portion, or
the top door has a fifth rim connected to the vehicle body top portion, and the top door opens and closes the first opening of the vehicle body top portion with the fifth rim as a rotating shaft; the side door body has a sixth rim connected to the vehicle body side skirt, and the side door body opens and closes the second opening in the vehicle body side skirt with the sixth rim as a rotating shaft.

13. The vehicle door system of claim 1, further comprising:
a first sliding mechanism and a second sliding mechanism, wherein the first sliding mechanism and the second sliding mechanism are both provided between the vehicle body side skirt and the side door body, and the first sliding mechanism and the second sliding mechanism are configured to, in synchronization, drive the side door body to move relative to the vehicle body side skirt.

14. The vehicle door system of claim 13, wherein the sliding mechanisms of the vehicle door system are arranged in one way of the following:
the first sliding mechanism and the second sliding mechanism are arranged in a staggered manner in a direction from the vehicle body top portion to the vehicle body bottom portion, and the first sliding mechanism and the second sliding mechanism are arranged in a staggered manner in a direction from the vehicle body head portion to the vehicle body tail portion;
the first sliding mechanism comprises a first guide rail, a first hinge mount, and a first trolley, and wherein the first guide rail is provided on the vehicle body side skirt, the first hinge mount is provided on the side door body, the first trolley is provided on the first hinge mount, and the first trolley is capable of sliding along the first guide rail; or
the second sliding mechanism comprises a second guide rail, a second hinge mount, and a second trolley, and wherein the second guide rail is provided on the vehicle body side skirt, the second hinge mount is provided on the side door body, the second trolley is provided on the second hinge mount, and the second trolley is capable of sliding along the second guide rail.

15. The vehicle door system of claim 1, wherein the vehicle door system further comprises at least one of the following:
a support driving assembly, wherein the support driving assembly is connected to the top door at one end, and connected to the vehicle body top portion or the side skirt at other end, so as to drive the top door to open and close the first opening;

a hinge assembly, wherein the top door has a fifth rim connected to the vehicle body top portion, and the fifth rim of the top door is hinged to the vehicle body top portion by the hinge assembly, wherein the top door has a third rim and a fourth rim, wherein the third rim cooperates with a front edge of the first opening, the fourth rim cooperates with a rear edge of the first opening, the hinge assembly is a four-bar assembly, the four-bar assembly is arranged at the third rim and the fourth rim of the top door, and the top door is hinged to the vehicle body top portion by the four-bar assembly;

a sealing member, wherein the sealing member comprises a top doorway sealing member and a side doorway sealing member, the top doorway sealing member is provided at the rim of the top doorway, and the side doorway sealing member is provided at the rim of the side doorway; or an obstacle detector and a vehicle door controller, wherein the obstacle detector is provided on any one of the top door, the side door, and the vehicle body, and configured to detect whether there is an obstacle in an opening and closing stroke of the top door and/or the side door; and the vehicle door controller is provided on any one of the top door, the side door, and the vehicle body, and is configured to control movement of at least one of the side door, the top door, and the side window.

16. The vehicle door system of claim 10, wherein the corner window is mounted at an edge of the fourth opening, and the corner window is capable of raising and lowering relative to the edge of the fourth opening, wherein the corner window has a corner window side rim and a corner window top rim, the corner window side rim forms a portion of an edge of the third opening, the corner window side rim cooperates with a side rim of the side window, the top door has a first rim adjacent the top edge of the side window, and a second rim extending along a direction of the first rim towards a vehicle body tail portion, and the corner window top rim cooperates with the second rim; and wherein at least one of the corner window side rim, the corner window top rim, and the second rim is provided with a sealing member.

\* \* \* \* \*